(12) United States Patent
Park et al.

(10) Patent No.: US 12,457,148 B2
(45) Date of Patent: Oct. 28, 2025

(54) UNDERWATER NETWORK MANAGEMENT SYSTEM AND OPERATION METHOD THEREOF

(71) Applicant: Kookmin University Industry Academy Cooperation Foundation, Seoul (KR)

(72) Inventors: Soohyun Park, Gyeonggi-do (KR); Sooyoung Shin, Daejeon (KR); Delphinraj Kesari, Seoul (KR); Eunbi Ko, Seoul (KR); Jinyoung Lee, Seoul (KR); Sunho Yum, Gyeonggi-do (KR)

(73) Assignee: Kookmin University Industry Academy Cooperation Foundation, Seoul (KR)

( * ) Notice: Subject to any disclaimer, the term of this patent is extended or adjusted under 35 U.S.C. 154(b) by 374 days.

(21) Appl. No.: 18/011,391

(22) PCT Filed: Feb. 15, 2021

(86) PCT No.: PCT/KR2021/001920
§ 371 (c)(1),
(2) Date: Dec. 19, 2022

(87) PCT Pub. No.: WO2021/256655
PCT Pub. Date: Dec. 23, 2021

(65) Prior Publication Data
US 2023/0308341 A1    Sep. 28, 2023

(30) Foreign Application Priority Data

Jun. 19, 2020 (KR) .................. 10-2020-0074925
Jan. 15, 2021 (KR) .................. 10-2021-0006156
Feb. 9, 2021 (KR) .................. 10-2021-0018157

(51) Int. Cl.
*H04L 41/046* (2022.01)
*H04B 13/02* (2006.01)
*H04W 88/16* (2009.01)

(52) U.S. Cl.
CPC .......... *H04L 41/048* (2013.01); *H04B 13/02* (2013.01); *H04W 88/16* (2013.01)

(58) Field of Classification Search
CPC ..... H04B 13/02; H04L 41/048; H04L 41/046; H04L 43/0811; H04L 43/0817; H04W 88/16
See application file for complete search history.

(56) References Cited

U.S. PATENT DOCUMENTS 5,303,207 A * 4/1994 Brady .................. H04B 11/00
                                                    367/134
5,661,467 A * 8/1997 Harada .................. H04B 17/40
                                                    709/209

(Continued)

FOREIGN PATENT DOCUMENTS

KR   10-2009-0010513 A   1/2009
KR   10-2010-0077707 A   7/2010

(Continued)

OTHER PUBLICATIONS

Underwater Network Management System in Internet of Underwater Things (Year: 2020).*

(Continued)

*Primary Examiner* — Dung B Huynh
(74) *Attorney, Agent, or Firm* — Sughrue Mion, PLLC

(57) ABSTRACT

An underwater network management system includes a manager corresponding to a management station, and a plurality of agents connected to the manager and corresponding to a gateway and a plurality of underwater devices, wherein each of the manager and the plurality of agents includes an underwater management information base (Continued)

including a plurality of managed objects for managing an underwater network and the plurality of underwater devices, and the manager controls operations for status monitoring and management of the underwater network and the plurality of underwater devices based on information included in managed objects provided from the plurality of agents.

14 Claims, 17 Drawing Sheets

(56) References Cited

U.S. PATENT DOCUMENTS

| | | | |
|---|---|---|---|
| 7,369,856 B2 | 5/2008 | Ovadia | |
| 7,382,947 B1* | 6/2008 | Moskowitz | H04B 10/0773 385/48 |
| 9,204,472 B1* | 12/2015 | Boyle | H04W 76/11 |
| 9,240,688 B2* | 1/2016 | Hwang | H02J 4/00 |
| 9,838,896 B1* | 12/2017 | Barnickel | H04W 4/027 |
| 10,033,692 B1* | 7/2018 | Vavrusa | H04L 61/59 |
| 10,250,337 B1* | 4/2019 | Tobias | H04N 23/51 |
| 10,686,691 B2* | 6/2020 | Hu | H04W 4/40 |
| 11,134,062 B1* | 9/2021 | Ogrinz | H04L 67/02 |
| 11,683,831 B2* | 6/2023 | Ramesh | G05D 1/0291 370/336 |
| 12,145,702 B2* | 11/2024 | Laroche | B63C 11/26 |
| RE50,305 E * | 2/2025 | Patil | H04L 63/0846 |
| 2003/0117025 A1* | 6/2003 | Rouquette | G01V 1/22 307/147 |
| 2004/0107239 A1* | 6/2004 | Hasegawa | G06Q 10/103 709/200 |
| 2011/0141853 A1* | 6/2011 | Megdal | G01S 5/30 367/117 |
| 2012/0233199 A1* | 9/2012 | Jenkins | H04L 67/568 707/769 |
| 2013/0187787 A1* | 7/2013 | Damus | H04B 13/02 340/850 |
| 2013/0330083 A1* | 12/2013 | Song | H04B 10/80 398/104 |
| 2014/0010531 A1* | 1/2014 | Hu | H04J 14/0257 398/25 |
| 2014/0341584 A1* | 11/2014 | Hopewell | H04B 10/50 398/104 |
| 2015/0138920 A1 | 5/2015 | Hiller | |
| 2015/0223186 A1* | 8/2015 | Pierrel | H04L 67/12 455/456.6 |
| 2015/0245222 A1* | 8/2015 | Zhao | H04W 16/18 455/446 |
| 2015/0271025 A1* | 9/2015 | Yao | H04L 41/0894 370/241.1 |
| 2016/0099841 A1* | 4/2016 | Tiwari | G05B 19/4185 370/255 |
| 2016/0119065 A1* | 4/2016 | Tobias | G03B 17/08 348/81 |
| 2016/0259029 A1* | 9/2016 | Jukkala | B63B 22/16 |
| 2017/0118250 A1* | 4/2017 | Phillips | H04L 63/20 |
| 2017/0171834 A1* | 6/2017 | Neves | H01Q 1/52 |
| 2017/0195982 A1* | 7/2017 | Park | H04J 3/0641 |
| 2017/0215023 A1* | 7/2017 | Ly | H04W 60/005 |
| 2017/0223479 A1* | 8/2017 | Ly | H04W 4/70 |
| 2017/0227638 A1* | 8/2017 | Nicoletti | H04B 11/00 |
| 2017/0244477 A1* | 8/2017 | Seo | H04B 7/2671 |
| 2017/0295448 A1* | 10/2017 | McCann | H04W 12/04 |
| 2017/0318520 A1* | 11/2017 | Costa | H04B 1/3822 |
| 2018/0099733 A1* | 4/2018 | Sato | H04B 11/00 |
| 2018/0152335 A1* | 5/2018 | Matsuki | H04L 9/40 |
| 2018/0158340 A1* | 6/2018 | de Moura | G07C 5/008 |
| 2018/0183882 A1* | 6/2018 | Flynn | H04L 69/321 |
| 2018/0288806 A1* | 10/2018 | Roccapriore | G01S 13/74 |
| 2018/0295535 A1* | 10/2018 | Kavars | G06F 1/28 |
| 2018/0298754 A1* | 10/2018 | Kodaira | B63B 22/24 |
| 2018/0309766 A1* | 10/2018 | Marnfeldt | G06F 8/654 |
| 2018/0375592 A1* | 12/2018 | Ko | H04B 17/327 |
| 2019/0007146 A1* | 1/2019 | Ko | H04B 13/02 |
| 2019/0021039 A1* | 1/2019 | Sudarsan | H04L 67/12 |
| 2019/0110452 A1* | 4/2019 | Greenberg | H04B 11/00 |
| 2019/0132236 A1* | 5/2019 | Rahman | H04W 88/18 |
| 2019/0140778 A1* | 5/2019 | Kishikawa | G07C 5/0808 |
| 2019/0141785 A1* | 5/2019 | Chou | H04L 41/0816 |
| 2019/0222485 A1* | 7/2019 | Sethi | H04W 24/06 |
| 2019/0349426 A1* | 11/2019 | Smith | H04L 41/0806 |
| 2019/0387509 A1* | 12/2019 | Ko | H04B 7/26 |
| 2019/0394428 A1* | 12/2019 | Nam | H04N 7/183 |
| 2020/0150648 A1* | 5/2020 | Horita | G05D 1/0027 |
| 2020/0154401 A1* | 5/2020 | Maguire | H04L 41/145 |
| 2020/0270951 A1* | 8/2020 | Xiao | E21B 19/008 |
| 2020/0304372 A1* | 9/2020 | Henry | H04W 28/0226 |
| 2021/0084469 A1* | 3/2021 | McCann | H04W 12/35 |
| 2021/0084577 A1* | 3/2021 | Wakabayashi | H04W 76/16 |
| 2021/0152259 A1* | 5/2021 | Jongsma | H10F 30/225 |
| 2021/0153226 A1* | 5/2021 | Garcia-Luna-Aceves | H04W 72/0446 |
| 2021/0194597 A1* | 6/2021 | Aida | H04B 10/80 |
| 2021/0226843 A1* | 7/2021 | Bhaduri | H04L 41/0806 |
| 2021/0333423 A1* | 10/2021 | Raghukumar | G01S 5/20 |
| 2021/0360070 A1* | 11/2021 | Cella | H04L 67/565 |
| 2022/0014392 A1* | 1/2022 | Katou | H04L 12/40013 |
| 2022/0191283 A1* | 6/2022 | Cella | H04N 19/136 |
| 2022/0271779 A1* | 8/2022 | Ma | H04B 1/0003 |
| 2022/0342099 A1* | 10/2022 | Pei | G01V 1/157 |
| 2022/0378026 A1* | 12/2022 | Vincent | A01K 69/08 |
| 2022/0400519 A1* | 12/2022 | Matsuda | H04W 74/0833 |
| 2023/0318702 A1* | 10/2023 | Kanai | H04B 10/077 398/30 |
| 2023/0370879 A1* | 11/2023 | Chou | H04W 24/08 |
| 2024/0007197 A1* | 1/2024 | Kong | H04B 10/80 |
| 2024/0149368 A1* | 5/2024 | Yang | B23K 9/0061 |
| 2024/0163828 A1* | 5/2024 | Cao | H04W 76/12 |
| 2024/0171290 A1* | 5/2024 | Belani | H04B 13/02 |
| 2024/0356658 A1* | 10/2024 | Mesharafa | H04B 10/80 |
| 2024/0361752 A1* | 10/2024 | Burleson | G05B 19/4155 |
| 2024/0425149 A1* | 12/2024 | Runge | H02G 9/12 |
| 2025/0024529 A1* | 1/2025 | Iida | H04B 11/00 |

FOREIGN PATENT DOCUMENTS

| | | |
|---|---|---|
| KR | 10-1016444 B1 | 2/2011 |
| KR | 10-2012-0072288 A | 7/2012 |
| KR | 10-2014-0023902 A | 2/2014 |
| KR | 10-2014-0032177 A | 3/2014 |
| KR | 10-2019-0062921 A | 6/2019 |
| WO | 2012/115609 A1 | 8/2012 |

OTHER PUBLICATIONS

Notification of Reason for Refusal for Korean Patent Application KR 10-2021-0018157 dated Jan. 11, 2022.
International Search Report for PCT/KR2021/001920 dated May 28, 2021.
Office Action dated January 9, 202 from the Korean Patent Office in Application No. 10-2021-0006156.

* cited by examiner

UNDERWATER NETWORK MANAGEMENT SYSTEM AND OPERATION METHOD THEREOF

CROSS REFERENCE TO RELATED APPLICATIONS

This application is a National Stage of International Application No. PCT/KR2021/001920, filed on Feb. 15, 2021, claiming priority based on Korean Patent Application No. 10-2020-0074925, filed on Jun. 19, 2020, Korean Patent Application No. 10-2021-0006156, filed on Jan. 15, 2021 and Korean Patent Application No. 10-2021-0018157, filed on Feb. 9, 2021, the contents of which are incorporated herein by reference in their entireties.

TECHNICAL FIELD

The present disclosure relates to an underwater network management system and an operation method thereof.

BACKGROUND ART

Water covers about 70% of the Earth's surface. Recently, new technologies related to underwater ecosystem investigation, resource exploration, contaminant and pollution level measurement, monitoring such as weather observation, and underwater data collection for the same have emerged.

In an underwater network management system for managing an underwater network and underwater devices, systematic management of various information such as underwater data may be required. However, the underwater environment has different characteristics from the terrestrial environment, and resource availability of devices used underwater may be significantly different from resource availability of devices used on land. In addition, because management information base (MIB) of the terrestrial network has a large number of managed objects (MOs), it is difficult to apply them to the underwater network.

Underwater networks are being actively developed for networking using underwater vehicles such as an autonomous underwater vehicle (AUV) and a remotely operated vehicle (ROV), and it may be necessary to implement an underwater management information base for nodes having such mobility.

DESCRIPTION OF EMBODIMENTS

Technical Problem

The present invention provides an underwater network management system implemented with an underwater management information base (underwater-MIB (u-MIB)) for the management of underwater networks and underwater devices.

The present invention provides an underwater network management system capable of minimizing reliability degradation due to changes in the underwater communication environment when transmitting and receiving underwater management information.

The present invention provides an underwater network management system considering the mobility of nodes (agents) constituting an underwater network.

Solution to Problem

According to an aspect of the disclosure, an underwater network management system comprises a manager corresponding to a management station, and a plurality of agents connected to the manager and corresponding to a gateway and a plurality of underwater devices, each of the manager and the plurality of agents comprises an underwater management information base (u-MIB) including a plurality of managed objects for managing an underwater network and the plurality of underwater devices, and the manager controls operations for status monitoring and management of the underwater network and the plurality of underwater devices based on information included in managed objects provided from the plurality of agents.

According to an exemplary embodiment, each of the plurality of agents transmits a response message including at least one of a plurality of managed objects included in the underwater management information base to the manager in response to a request message transmitted from the manager, or in response to an event occurring in a corresponding gateway or underwater device, transmits a trap message including at least one managed object related to the event to the manager.

According to an exemplary embodiment, the plurality of agents comprise a proxy agent corresponding to the gateway, a master agent corresponding to an underwater device connected to the proxy agent from among the plurality of underwater devices, and a sub agent corresponding to an underwater device connected to the master agent, the proxy agent transmits the request message received from the manager to the master agent, the master agent transmits the request message to the sub agent, receives a first response message including at least one first managed object related to the request message from the sub agent, and transmits a second response message including the at least one first managed object included in the received first response message and at least one second managed object related to the request message from among managed objects of the master agent to the proxy agent, and the proxy agent transmits a third response message including the at least one first managed object and the at least one second managed object included in the second response message received from the master agent to the manager.

According to an exemplary embodiment, the plurality of agents comprise a proxy agent corresponding to the gateway, and a plurality of sub agents corresponding to the plurality of underwater devices, the proxy agent comprises a plurality of temporary management information bases corresponding to the plurality of sub agents, and updates a first temporary management information base corresponding to the first sub agent based on at least one managed object included in a message received from a first sub agent from among the plurality of sub agents.

According to an exemplary embodiment, the proxy agent further comprises a log recorder configured to record a point in time at which a message is received or a point in time at which a temporary management information base is updated for each of the plurality of sub agents.

According to an exemplary embodiment, the proxy agent receives the request message from the manager, obtains at least one management object related to the request message from the first sub agent or the first temporary management information base based on whether communication with the first sub agent from among the plurality of sub agents is possible, and transmits a response message including the obtained at least one managed object to the manager.

According to an exemplary embodiment, the proxy agent obtains at least one managed object related to the request message from the first sub agent when communication with the first sub agent is possible, and obtains at least one managed object related to the request message from the first temporary management information base when communication with the first sub agent is impossible.

According to an exemplary embodiment, the proxy agent stores the request message when communication with the first sub agent is impossible, transmits the request message to the first sub agent when a preset time elapses or when communication with the first sub agent is detected, receives at least one managed object related to the request message from the first sub agent, and transmits a response message including the received at least one managed object to the manager.

According to an exemplary embodiment, the proxy agent updates the first temporary management information base based on the at least one managed object received from the first sub agent.

According to an aspect of the disclosure, an operation method of an underwater network management system comprises receiving, by a gateway included in the underwater network management system, a request message from a management station; receiving a response message including information related to the request message from at least one of a plurality of underwater devices connected to the gateway; and transmitting a response message including information included in at least one received response message to the management station, the information related to the request message corresponds to at least one managed object related to the request message from among a plurality of managed objects included in an underwater management information base of each of the plurality of underwater devices.

Advantageous Effects of Disclosure

An underwater network management system according to the present disclosure may more systematically manage information required for the management of an underwater network by using an underwater management information base optimized for an underwater network and lightweight.

In addition, in the underwater network management system, a plurality of temporary management information bases corresponding to a plurality of sub agents are implemented in a proxy agent corresponding to a gateway, thereby minimizing information transmission delay to a manager due to a decrease in connectivity of underwater devices in an underwater network.

In addition, the underwater management information base implemented in the underwater network management system includes an information item (managed object) for reflecting the mobility of a node (agent) constituting an underwater network, so that smooth communication may be maintained by effectively reconfiguring the underwater network when the node moves.

Effects according to the inventive concept are not limited to the effects described above, and other effects not described herein may be clearly understood by one of ordinary skill in the art from the following description.

BRIEF DESCRIPTION OF DRAWINGS

A brief description of each drawing is provided to more fully understand drawings recited in the present disclosure.

MODE OF DISCLOSURE

Embodiments according to the inventive concept are provided to more completely explain the inventive concept to one of ordinary skill in the art, and the following embodiments may be modified in various other forms and the scope of the inventive concept is not limited to the following embodiments. Rather, these embodiments are provided so that the disclosure will be thorough and complete, and will fully convey the scope of the inventive concept to one of ordinary skill in the art.

It will be understood that, although the terms first, second, etc. may be used herein to describe various members, regions, layers, sections, and/or components, these members, regions, layers, sections, and/or components should not be limited by these terms. These terms do not denote any order, quantity, or importance, but rather are only used to distinguish one component, region, layer, and/or section from another component, region, layer, and/or section. Thus, a first member, component, region, layer, or section discussed below could be termed a second member, component, region, layer, or section without departing from the teachings of embodiments. For example, as long as within the scope of this disclosure, a first component may be named as a second component, and a second component may be named as a first component.

Unless otherwise defined, all terms (including technical and scientific terms) used herein have the same meaning as commonly understood by one of ordinary skill in the art to which the inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

When a certain embodiment may be implemented differently, a specific process order may be performed differently from the described order. For example, two consecutively described processes may be performed substantially at the same time or performed in an order opposite to the described order.

As used herein, the term "and/or" includes any and all combinations of one or more of the associated listed items.

Hereinafter, embodiments of the inventive concept will be described in detail with reference to the accompanying drawings.

Figure 1:
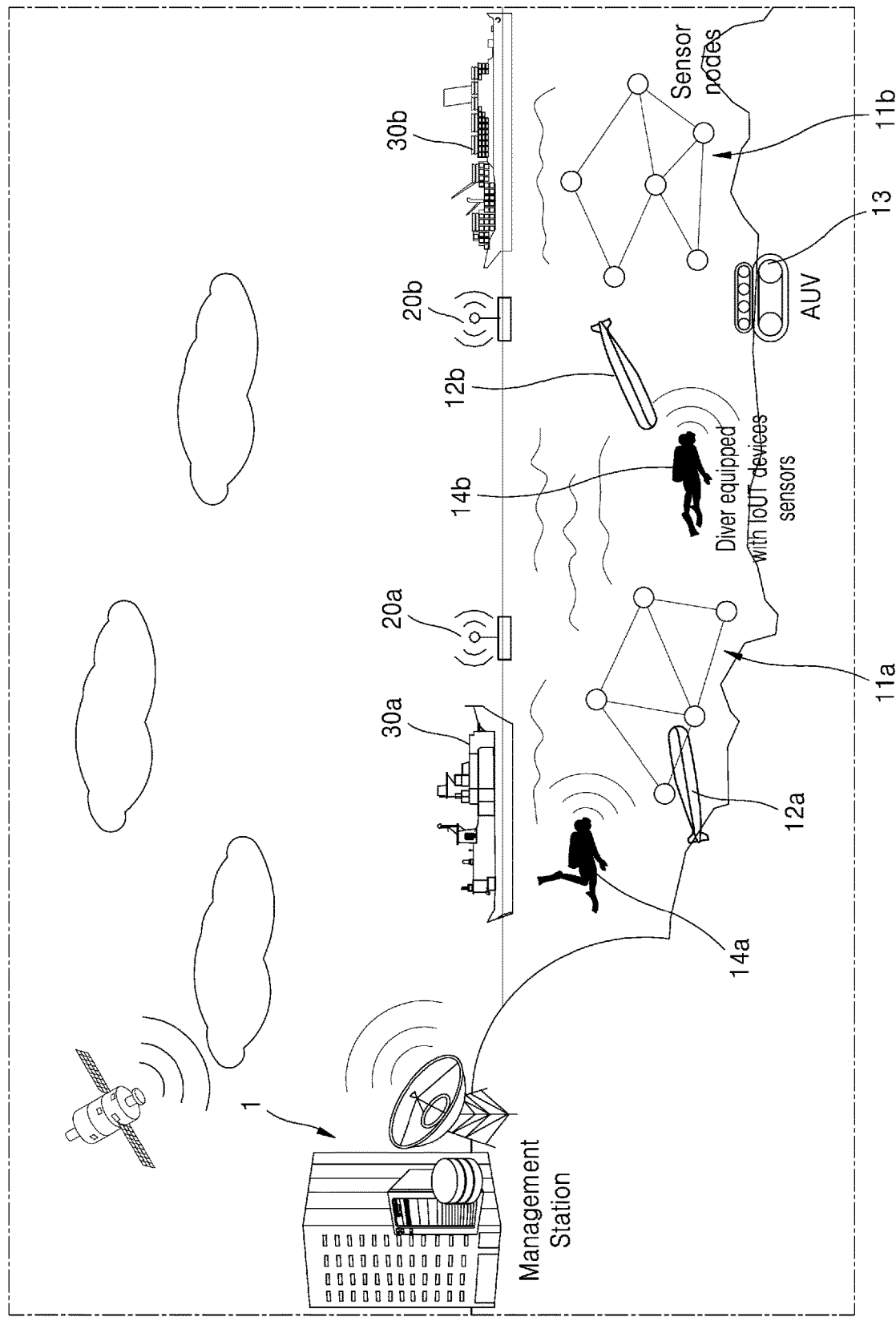
FIG. 1 is an exemplary conceptual diagram of an underwater communication system to which an underwater network management system of the present disclosure is applied.

FIG. 1 is an exemplary conceptual diagram of an underwater communication system to which an underwater network management system of the present disclosure is applied.

Referring to FIG. 1, the underwater communication system may include a management station (or a server) 1 on land, a plurality of wireless communication devices 11a, 11b, 12a, 12b, 13, 14a, and 14b (or node) (hereinafter referred to as '10') in the water, and gateways 20a and 20b (hereinafter referred to as '20') on the water between the management station 1 and the wireless communication device 10.

The management station 1 may be connected to the gateways 20a and 20b and the underwater wireless communication device 10 through a terrestrial base station antenna or a satellite. The management station 1 may perform all operations related to management of data, resources, and the devices 10 and 20 of the underwater communication system. For example, the management station 1 may provide information for use in various fields by storing or processing various data provided from the underwater wireless communication devices 10. In addition, the management station 1 may perform operations such as checking and managing status of the devices 10 and 20 included in the underwater communication system. For example, the management station 1 may be implemented as a server or the like, but is not limited thereto.

The gateway 20 is connected between the management station 1 and the wireless communication devices 10 to enable data exchange between the management station 1 and the wireless communication devices 10. To this end, the gateway 20 may support various known wireless communication methods (e.g., mobile communication methods such as LTE and 5G, satellite communication methods, etc.) for wireless communication with the management station 1, and may support underwater wireless communication methods (e.g., sound wave communication, visible light communication, infrared communication, low frequency communication, magnetic field communication, etc.) for underwater wireless communication with the wireless communication device 10. According to an embodiment, the gateway 20 may be implemented as a communication device installed in ships 30a and 30b.

The wireless communication devices 10 may include various devices deployed or used underwater, and each of the devices may support an underwater wireless communication method. For example, the wireless communication devices 10 may include a plurality of sensor nodes 11a and 11b for sensing data for measuring and monitoring the underwater environment, underwater vehicles 12a and 12b, an autonomous underwater vehicle (AUV) 13, and/or communication devices 14a and 14b mounted on diver's equipment or carried by a diver. The wireless communication devices 10 may form a network by being directly or indirectly connected to each other using an underwater wireless communication method.

The wireless communication devices 10 may transmit various data obtained according to the operation of a device, such as data related to the underwater environment, to the management station 1 through the gateway 20. Hereinafter, for convenience of description, the wireless communication device 10 is referred to as an underwater device 10, but the wireless communication device 10 is not limited to a device used only underwater.

A network management system (NMS) for management of a communication network and devices constituting the communication network may be implemented in a communication system. Even in the case of the underwater communication system shown in FIG. 1, an underwater network management system (U-NMS) for managing the underwater network and the devices 10 and 20 may be implemented. The underwater network management system may be implemented in hardware, software, or a combination thereof.

However, the underwater environment has different characteristics from the terrestrial environment in which a general communication system is provided, and resource availability (power supply, etc.) of the underwater device 10 may be significantly different from resource availability of a communication device used on land. In addition, a management information base (MIB) of a terrestrial network holds numerous managed objects (MOs). Accordingly, it may be inefficient to apply a network management system and a management information base of a conventional general communication system to the underwater communication system.

According to embodiments of the present disclosure, the underwater network management system may manage information for the operation of an underwater network more systematically by using an underwater management information base (u-MIB) optimized for the underwater network. Hereinafter, various embodiments related to an underwater network management system and an underwater management information base of the present disclosure will be described with reference to FIGS. 2 to 8.

Figure 2:
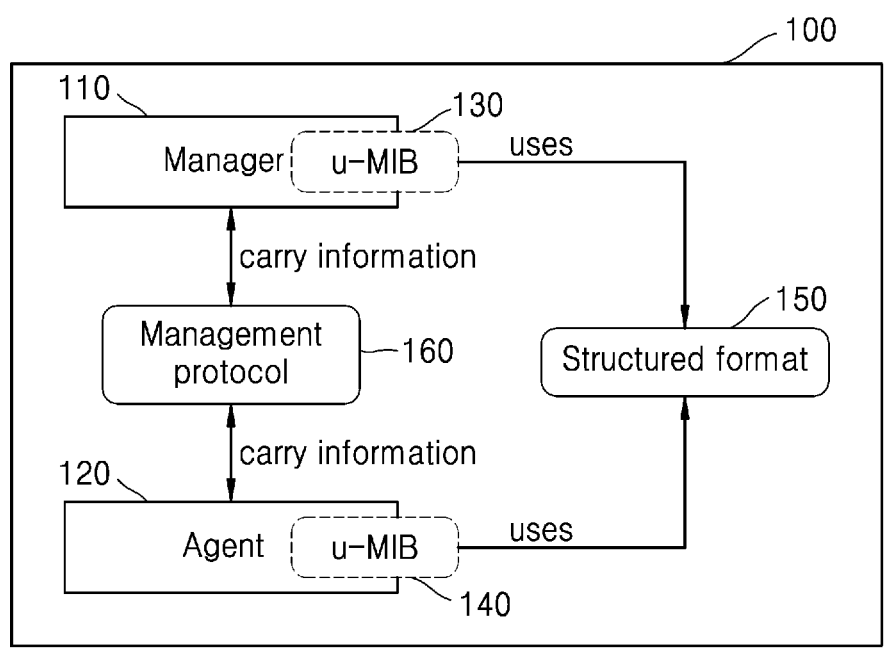
FIG. 2 is a view schematically illustrating the configuration of an underwater network management system according to an exemplary embodiment of the present disclosure.
Figure 3:
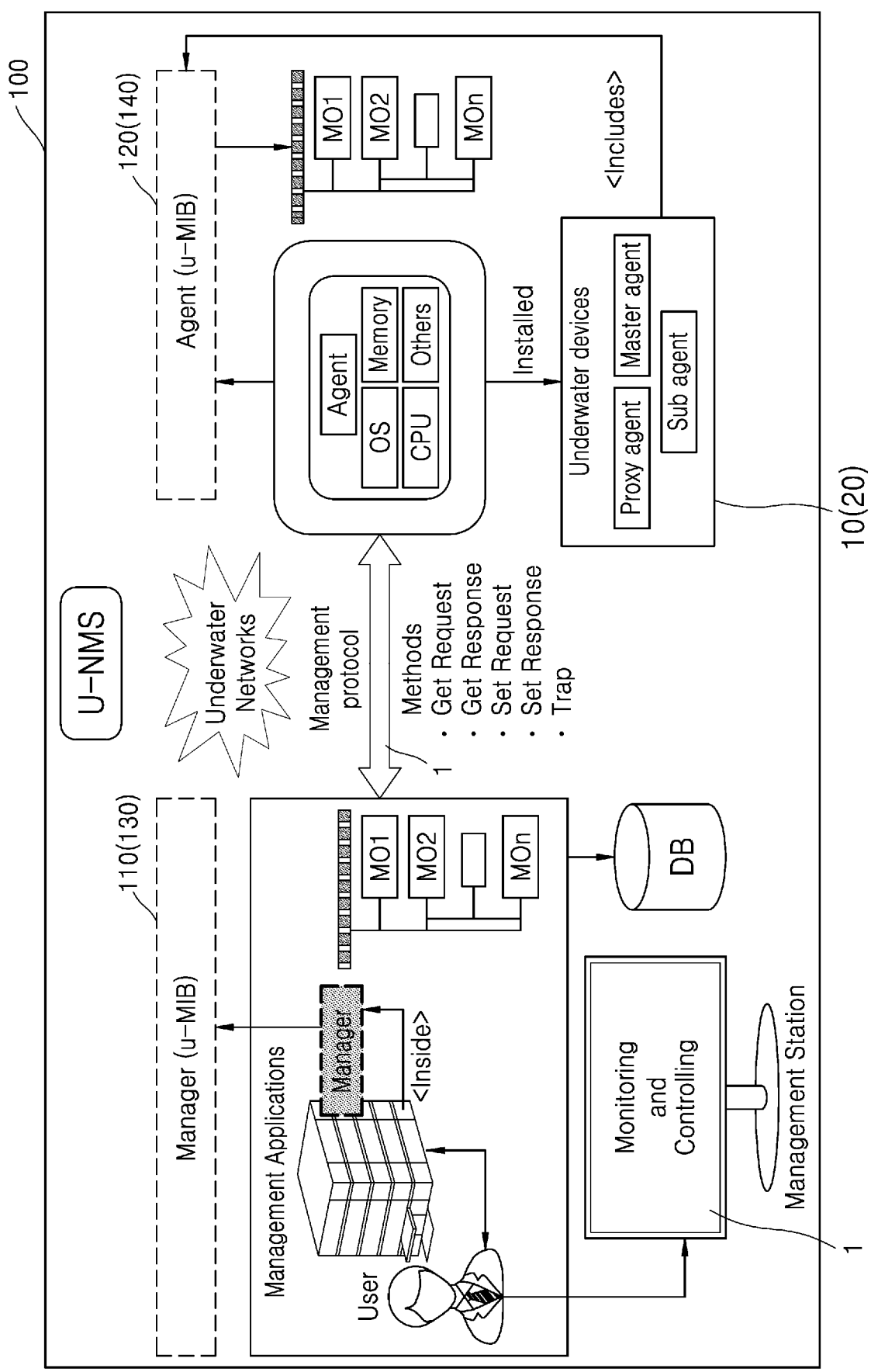
FIG. 3 is a view illustrating the underwater network management system shown in FIG. 2 in more detail.

FIG. 2 is a view schematically illustrating the configuration of an underwater network management system according to an exemplary embodiment of the present disclosure. FIG. 3 is a view illustrating the underwater network management system shown in FIG. 2 in more detail.

Referring to FIG. 2, an underwater network management system 100 may include a manager 110 and an agent 120. Each of the manager 110 and agent 120 may be implemented as hardware, software, or a combination thereof, but is not limited thereto.

For example, the manager 110 may manage the devices 10 and 20 included in an underwater network and/or control all functions of the underwater network. The manager 110 may be implemented as the management station 1 or a device included in the management station 1, or may include a program (a management application 310, etc.) installed in the management station 1. The manager 110 may monitor or control status of the underwater network or the devices 10 and 20 based on various management information provided from the agent 120.

The agent 120 may be included in the aforementioned underwater device 10 and gateway 20. For example, the underwater device 10 and the gateway 20 may include a device 320 having a processor (a central processing unit (CPU), etc.), a memory, an operating system (OS), an agent, and other components. The agent 120 may provide various information generated or obtained from the underwater device 10 and/or the gateway 20 to the manager 110.

The manager 110 and agent 120 may include underwater management information bases (u-MIBs) 130 and 140, respectively. The underwater management information bases 130 and 140 may correspond to databases designed for management of components included in the underwater network management system. The underwater management information bases 130 and 140 may correspond to a set of managed objects (MOs) using a structured format 150 to define names and entities suitable for the underwater network management system 100. Each of the managed objects (MOs) may include various management information related to an underwater network and/or the devices 10 and 20 included in the underwater network.

As described above, because a management information base of a conventional general terrestrial network maintains an excessive number of managed objects (MOs), it may not be suitable for application to an underwater network. Accordingly, the underwater management information bases 130 and 140 according to an embodiment of the present disclosure are implemented as a lightweight database including only the minimum managed objects (MOs) necessary for managing the underwater network and the devices 10 and 20, thereby enabling efficient management of the underwater network. Implementation examples of the underwater management information bases 130 and 140 will be described in more detail later with reference to FIGS. 4 to 8.

With continued reference to FIGS. 2 and 3, the manager 110 and the agent 120 may transmit and receive messages and/or information according to a packet exchange format defined by a management protocol 160. For example, the manager 110 may receive managed objects (MOs) from the agent 120 using a request message (Get Request or Set Request) and manage them. The agent 120 may transmit a response message (Get Response or Set Response) including the managed objects (MOs) to the manager 110 in response to the request message. According to an embodiment, when an important event occurs in the corresponding device 10 or 20, the agent 120 may transmit a trap message (Trap) including managed objects (MOs) related to the important event to the manager 110. For example, the important event may include a temperature increase, a low battery level, an insufficient memory space, and the like.

Hereinafter, various embodiments related to the underwater management information bases 130 and 140 and managed objects (MOs) included in the underwater management information bases 130 and 140 will be described with reference to FIGS. 4 to 8.

FIGS. 4 to 8 are views illustrating specific configurations of an underwater management information base according to embodiments of the present disclosure.

Figure 4:
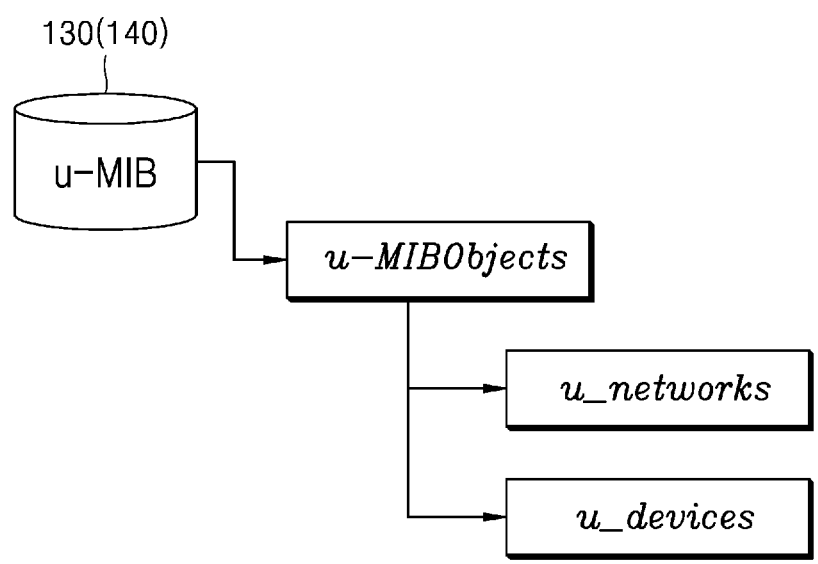
FIGS. 4 to 8 are views illustrating specific configurations of an underwater management information base according to embodiments of the present disclosure.

Referring to FIG. 4, the underwater management information bases 130 and 140 are a set of managed objects (MOs) in which underwater network management information is hierarchically structured, and may be organized into an underwater network and an underwater device using an object identifier (OID).

An underwater network section (u_networks) may be understood as underwater network information including a plurality of managed objects (MOs) (e.g., check connectivity between devices, etc.) for network connection management between the devices 10 and 20.

An underwater device section (u_devices) may be understood as underwater device information including a plurality of managed objects (MOs) (e.g., battery status of underwater devices, etc.) for management of devices (e.g., a proxy agent, a master agent, a sub agent, etc.) constituting an underwater network.

Figure 5:
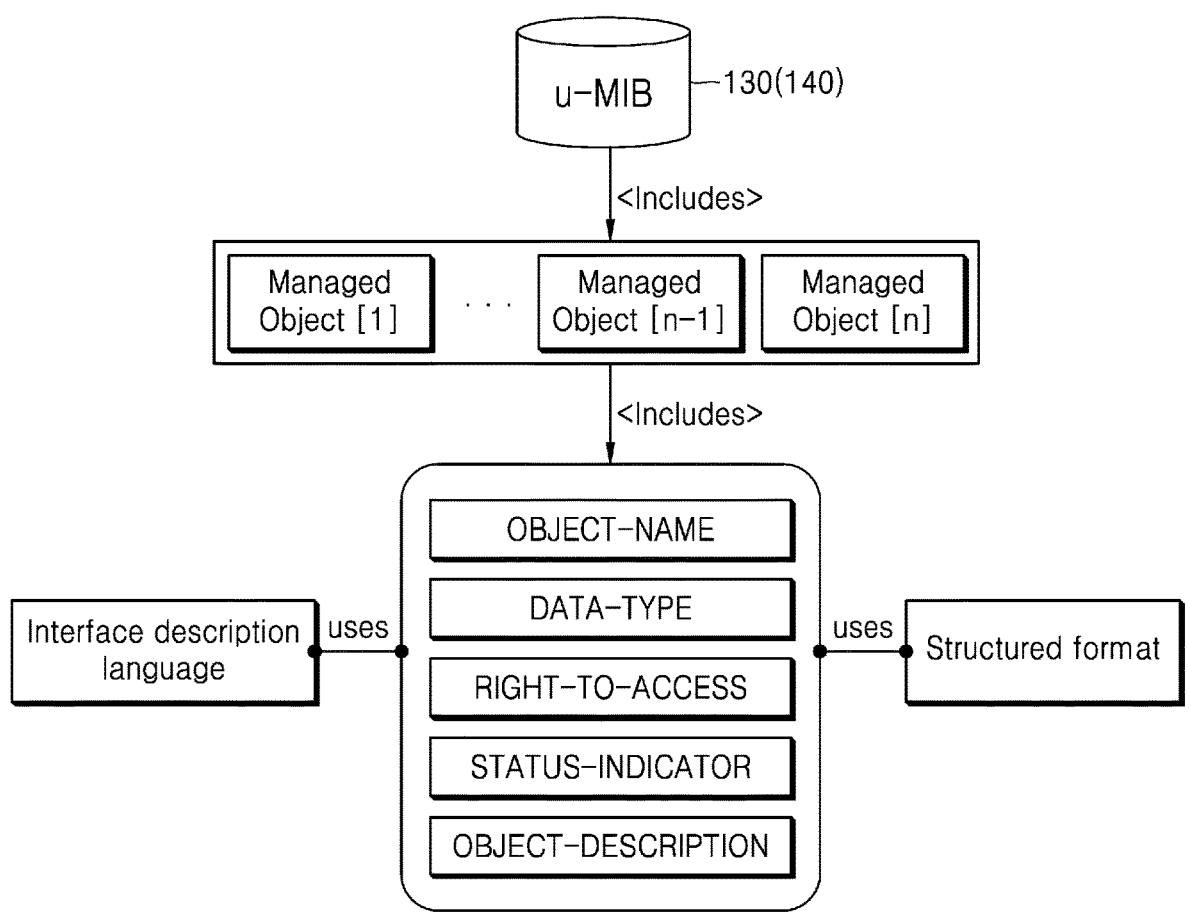

FIG. 5 shows an example of a general structure of the underwater management information bases 130 and 140. Referring to FIG. 5, the underwater management information bases 130 and 140 may include a plurality of managed objects (MOs), and each of the plurality of managed objects (MOs) may be included in the underwater network section (u_networks) or the underwater device section (u_devices).

For example, a managed object (MO) may be defined by an object name (OBJECT-NAME), a data type (DATA-TYPE), an access right (RIGHT-TO-ACCESS), a status indicator (STATUS-INDICATOR), and an object description (OBJECT-DESCRIPTION). The object name indicates the name of an object, such as a device name or a management information base version, and the data type indicates the type of data (e.g., integer, string, time, etc.) corresponding to the object name. The access right may indicate the right to retrieve an object (read-write, read-only, etc.), the status indicator may indicate whether the object is mandatory or optional, and the object description may indicate a description (text) of the object.

An interface description language may be used to define managed objects (MOs), and a structured format may be used to define names of the objects.

Figure 6:
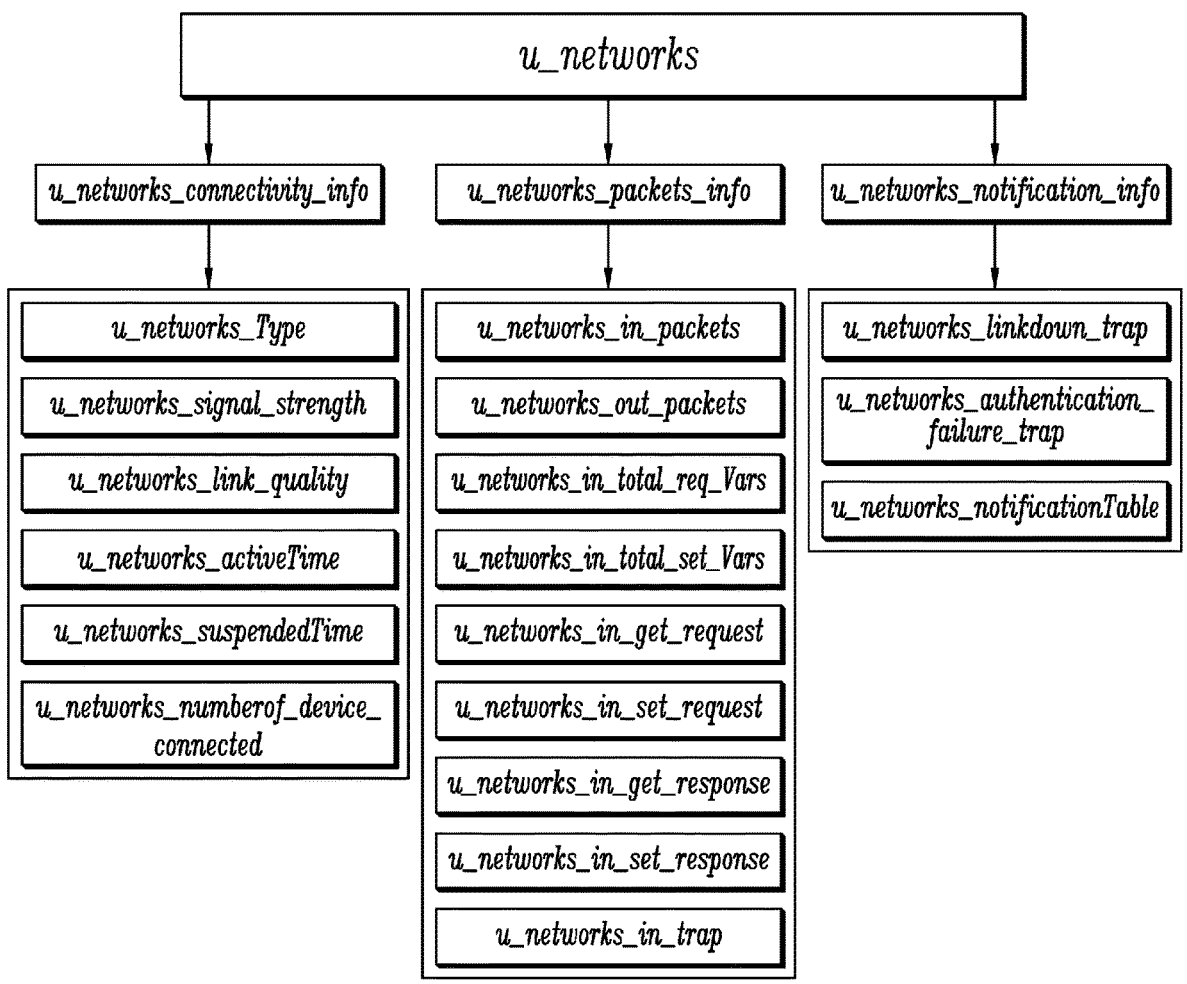

FIG. 6 shows an example of a managed object included in the underwater network section (u_networks) of the underwater management information bases 130 and 140.

Referring to FIG. 6, in order to manage an underwater network, information related to connectivity of a network, packets transmitted and received through the network, and notification according to events occurring in the network may be required. Managed objects (MOs) included in the underwater network section may be classified into categories of the connectivity, packets, and notification.

Each of Tables 1 to 3 below shows examples of configuration of managed objects included in the underwater network section (u_networks) and classification by category.

TABLE 1

| Group | MO name | Data type | Right to access | Description |
|---|---|---|---|---|
| u_networks_connectivity_info | u_networks_Type | STRING | read-only | It indicates the type of network connection with underwater devices such as acoustic-based network or RF-based network. '1' indicates acoustic signal and '2' indicates RF signal. |
| | u_networks_signal_strength | INTEGER | read-only | It indicates the average received signal strength (RSS) of acoustic-based network or RF-based networks in decibels (dB). |

TABLE 1-continued

| Group | MO name | Data type | Right to access | Description |
|---|---|---|---|---|
| | u_networks_link_quality | INTEGER | read-only | It indicates the link quality between the devices in the acoustic-based network or RF-based network because the network connectivity depends on the link quality of u_networks_Type. |
| | u_networks_activeTime | TIME | read-only | It indicates how long the device was active with the unique u_networks_Type. For example, how long the device connected with an acoustic-based network or RF-based network. |
| | u_networks_suspendedTime | TIME | read-only | It indicates when the connectivity was broken under the unique u_networks_Type. For example, when the device connectivity link was broken between under acoustic-based network or an RF-based network. |
| | u_networks_numberof_device_connected | INTEGER | read-only | It indicates the number of underwater devices connected to under u_networks_Type. For example, how many devices connected under the acoustic signal and how many devices connected under the RF signal. |

TABLE 2

| Group | MO name | Data type | Right to access | Description |
|---|---|---|---|---|
| u_networks_packets_info | u_networks_in_packets | INTEGER | read-only | It reports the total packets received via underwater networks. |
| | u_networks_out_packets | INTEGER | read-only | It reports the total packets transferred via underwater networks. |
| | u_networks_in_total_req_Vars | INTEGER | read-only | It reports the total number of MOs retrieved successfully using the Get request method. |
| | u_networks_in_total_set_Vars | INTEGER | read-only/ write-only | It reports the total number of MOs altered successfully using Set request method. |
| | u_networks_in_get_request | INTEGER | read-only | It reports the total number of Get Request accepted and processed by the underwater network management protocol. |
| | u_networks_in_set_request | INTEGER | read-only/ write-only | It reports the total number of Get Response accepted and processed by the underwater network management protocol. |
| | u_networks_in_get_response | INTEGER | read-only | It reports the total number of Get Response accepted and processed by the underwater network management protocol. |
| | u_networks_in_set_response | INTEGER | read-only | It reports the total number of Set Response accepted and processed by the underwater network management protocol. |
| | u_networks_in_trap | INTEGER | read-only | It reports the total number of Trap received and processed by the underwater network management protocol. |

TABLE 3

| Group | MO name | Data type | Right to access | Description |
|---|---|---|---|---|
| u_networks_notification_info | u_networks_linkdown_trap | INTEGER | read-only | It reports the failure if the communication link of any underwater device got down. Error code '1' indicates the link failure in devices. |
| | u_networks_authentication_failure_trap | INTEGER | read-only | It reports the failure, when the message sends from the manager to the agent is not authenticated. Error code '2' indicates the manager is not authenticated. |
| | u_networks_notificationTable | INTEGER | read-only | It updates and stores all the entries inside u_networks_notification_info. |

According to embodiments of Tables 1 to 3, the connectivity category may include information about the type of network, signal strength, connection quality, network activation time, network disconnection time, and the number of devices connected to the network. The packet category may include information such as the total amount of packets received and transmitted through the network, the number of processed requests or responses, and the number of managed objects searched or changed according to the requests or responses. The notification category may include information included in a trap message when an event occurs, such as a communication connection failure with a specific device or an authentication failure of a specific device.

The underwater network management system 100 may obtain various information for managing an underwater network through the managed objects (MOs) of the underwater network section (u_networks) described above, and may perform a management operation such as connection or maintenance of the underwater network based on the obtained information.

Figure 7:
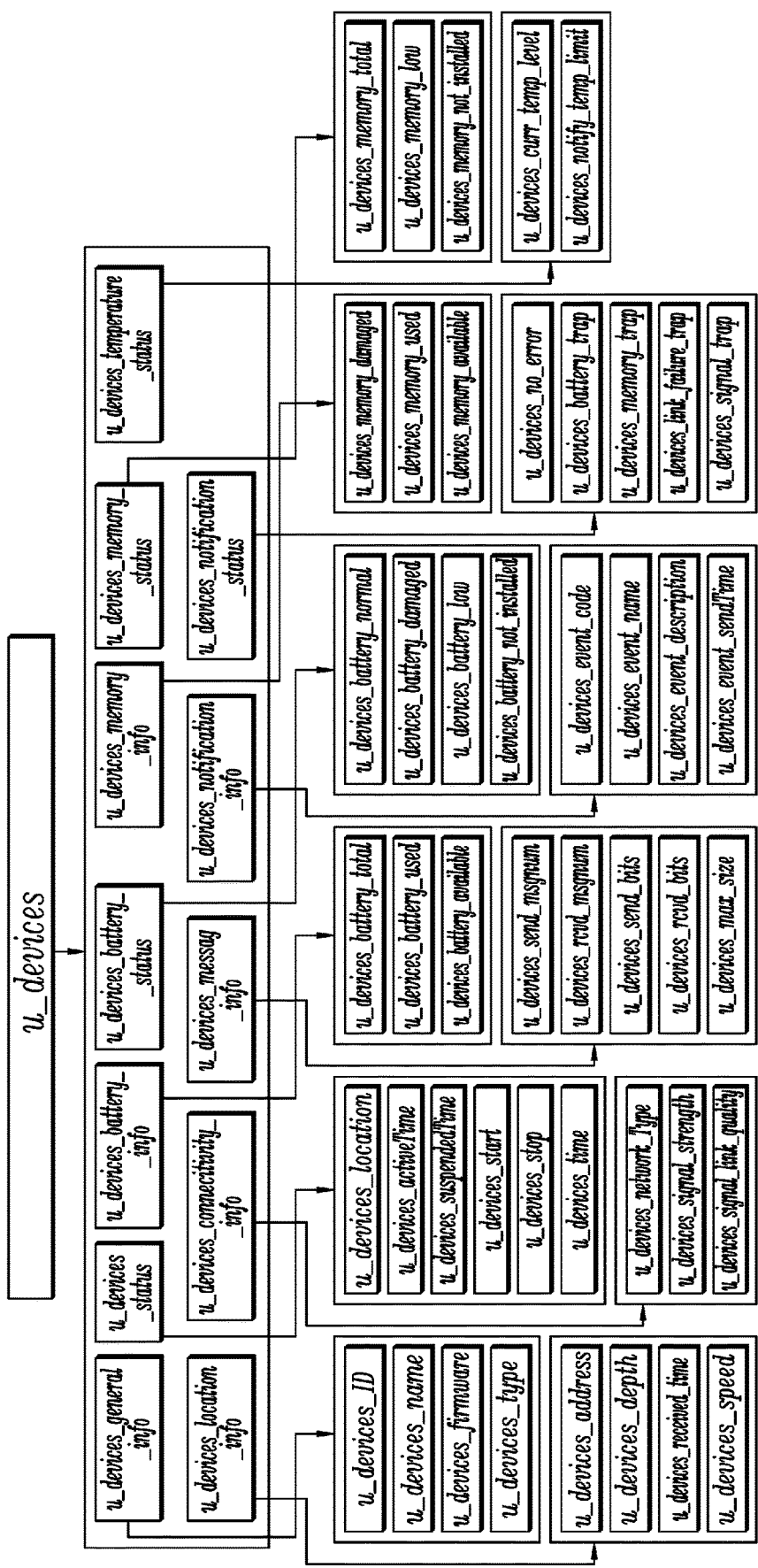

FIG. 7 shows an example of a managed object included in the underwater device section (u_devices) of the underwater management information bases 130 and 140.

Referring to FIG. 7, in order to manage underwater devices constituting an underwater network, it may be necessary to grasp information or status of a device, battery, memory, temperature, location, connectivity, message (packet), notification, and the like. Based on this, managed objects (MOs) included in the underwater device section (u_devices) may be classified into categories of device information, device status, battery information, battery status, memory information, memory status, temperature status, location information, connection information, message information, notification information, and notification status, respectively.

Each of Tables 4 to 6 below shows an example of configuration and category-specific classification of managed objects included in the underwater device section (u_devices).

TABLE 4

| Group | MO name | Data type | Right to access | Description |
|---|---|---|---|---|
| u_devices_general_info | u_devices_ID | STRING | read-only | It indicates the identification number of underwater devices. |
| | u_devices_name | STRING | read-only | It indicates the manufacturer's name of underwater devices. |
| | u_devices_firmware | STRING | read-only/ write-only | It indicates the current firmware version of underwater devices. |
| | u_devices_type | STRING | read-only | It indicates the type of underwater devices such as UUVs, UWA-GW, UWA-CH, UWA-SNode, etc. |
| u_devices_status | u_devices_location | INTEGER | read-only | It reports the existing location of underwater devices. |
| | u_devices_activeTime | TIME | read-only | It reports the active connection time of a unique underwater device. |
| | u_devices_suspendedTime | TIME | read-only | It reports the connection suspended time of a unique underwater device. |
| | u_devices_start | BOOLEAN | read-only | It starts to collect the device management resources such as battery level, memory level, etc. |
| | u_devices_stop | BOOLEAN | read-only | It stops to collect the management resources from underwater devices. |
| | u_devices_time | TIME | read-only/ write-only | It reports the current time of underwater devices, by increasing the time value in seconds. |
| u_devices_battery_info | u_devices_battery_total | INTEGER | read-only | It indicates the total power of the individual battery in underwater devices (in mAh). |
| | u_devices_battery_used | INTEGER | read-only | It indicates the used power of the individual battery in underwater devices (in mAh). |
| | u_devices_battery_available | INTEGER | read-only | It indicates the remaining power of individual battery IN underwater devices (in mAh). |

TABLE 4-continued

| Group | MO name | Data type | Right to access | Description |
|---|---|---|---|---|
| u_devices_battery_status | u_devices_battery_normal | INTEGER | read-only | It reports the battery has no problem. '1' is the code for the "battery working normally" in underwater devices. |
| | u_devices_battery_damaged | INTEGER | read-only | It reports if some physical damages (some problems are in the battery). '2' is the code for the "battery damages" in underwater devices. |
| | u_devices_battery_low | INTEGER | read-only | It reports the battery charge is low. So, battery replacement or battery recharging is important in this situation. '3' is the code for the "low battery" in underwater devices. |
| | u_devices_battery_not_installed | INTEGER | read-only | It reports the battery charge was not installed. '4' is the code for the "battery not installed" in underwater devices. |
| u_devices_memory_info | u_devices_memory_total | INTEGER | read-only | It indicates the total memory space in underwater devices (in MB/GB). |
| | u_devices_memory_used | INTEGER | read-only | It indicates the used memory space in underwater devices (in MB/GB). |
| | u_devices_memory_total | INTEGER | read-only | It indicates the available memory space in underwater devices (in MB/GB). |

TABLE 5

| Group | MO name | Data type | Right to access | Description |
|---|---|---|---|---|
| u_devices_memory_status | u_devices_memory_damaged | INTEGER | read-only | It reports the memory may be broken (some problem in memory). '1' is the code for the "memory damages" in underwater devices. |
| | u_devices_memory_low | INTEGER | read-only | It reports the memory level is low. So, formatting is important in this situation. '2' is the code for the "low memory" in underwater devices. |
| | u_devices_memory_not_installed | INTEGER | read-only | It reports the memory was not installed. '3' is the code for the "memory not installed" in underwater devices. |
| u_devices_temperature_status | u_devices_curr_temp_level | INTEGER | read-only | It indicates the current temperature of underwater devices. |
| | u_devices_notify_temp_limit | INTEGER | read-only | It indicates the limit value of temperature. It is useful when the temperature crosses its threshold in underwater devices. |
| u_devices_location_info | u_devices_address | INTEGER | read-only | It indicates the address to track the location of underwater devices. |
| | u_devices_depth | INTEGER | read-only | It indicates the distance from UWA-CH/UUV/UWA-SNode to UWA-GW to find the exact location. |
| | u_devices_received_time | TIME | read-only | It indicates the received time or the reflected time of the acoustic signal in seconds to find the exact distance between the underwater devices. |
| | u_devices_speed | INTEGER | read-only | It indicates the speed of the transmitted signal. |
| u_devices_connectivity_info | u_devices_network_Type | STRING | read-only | It indicates the type of network connection with underwater devices such as acoustic-based network or RF-based network. |
| | u_devices_signal_strength | INTEGER | read-only | It indicates the average received signal strength (RSS) of acoustic-based network or RF-based networks in decibels (dB). |
| | u_devices_signal_link_quality | INTEGER | read-only | It indicates the link quality between the devices in the acoustic-based network or RF-based network. |
| u_devices_message_info | u_devices_sent_msgnum | INTEGER | read-only | It reports the total number of messages to send by the devices through the network. |

TABLE 5-continued

| Group | MO name | Data type | Right to access | Description |
|---|---|---|---|---|
| | u_devices_rcvd_msgnum | INTEGER | read-only | It reports the total number of messages received from the devices through the network. |
| | u_devices_send_bits | INTEGER | read-only | It reports the size of the data sends from the devices in bits. |
| | u_devices_rcvd_bits | INTEGER | read-only | It reports the size of the data received from the devices in bits. |
| | u_devices_max_size | INTEGER | read-only | It reports the maximum size of the data collected by the devices in bits. |
| u_devices_notification_info | u_devices_event_code | INTEGER | read-only | It indicates the unique code of each event in underwater devices. |
| | u_devices_event_name | INTEGER | read-only | It indicates the device event name such as memory problem, battery problem, etc. |
| | u_devices_event_description | INTEGER | read-only | It indicates the detailed description of the error event occurring in underwater devices. |
| | u_devices_event_sendTime | INTEGER | read-only | It indicates the last time the event generated in underwater devices. |
| | u_devices_notificationTable | INTEGER | read-only | It updates and stores all the entries inside u_devices_notification_info. |

TABLE 6

| Group | MO name | Data type | Right to access | Description |
|---|---|---|---|---|
| u_devices_notification_status | u_devices_no_error | INTEGER | read-only | It reports no error in underwater devices. '1' is the code for reporting "No errors". |
| | u_devices_battery_trap | INTEGER | read-only | It reports a low battery level in underwater devices. '2' is the code for reporting "low battery" |
| | u_devices_memory_trap | INTEGER | read-only | It reports out of memory space problems in underwater devices. '3' is the code for reporting "low memory". |
| | u_devices_temp_trap | INTEGER | read-only | It reports if the temperature is increased and extends its threshold value. This increase in temperature may cause the failure of devices. '4' is the code for reporting "increasing temperature" in underwater devices. |
| | u_devices_link_failure_trap | INTEGER | read-only | It reports the connectivity problem between underwater devices. '5' is the code for reporting "connection failure". |
| | u_devices_low_signal_trap | INTEGER | read-only | It reports if the devices receive low RSS value. '6' is the code for reporting "Low signal strength". |

The underwater network management system 100 may obtain various information for managing underwater devices through the managed objects (MOs) of the underwater device section (u_devices) described above, may monitor status of underwater devices based on the obtained information, and may perform control and management operations for the underwater devices based on the monitored status.

Figure 8:
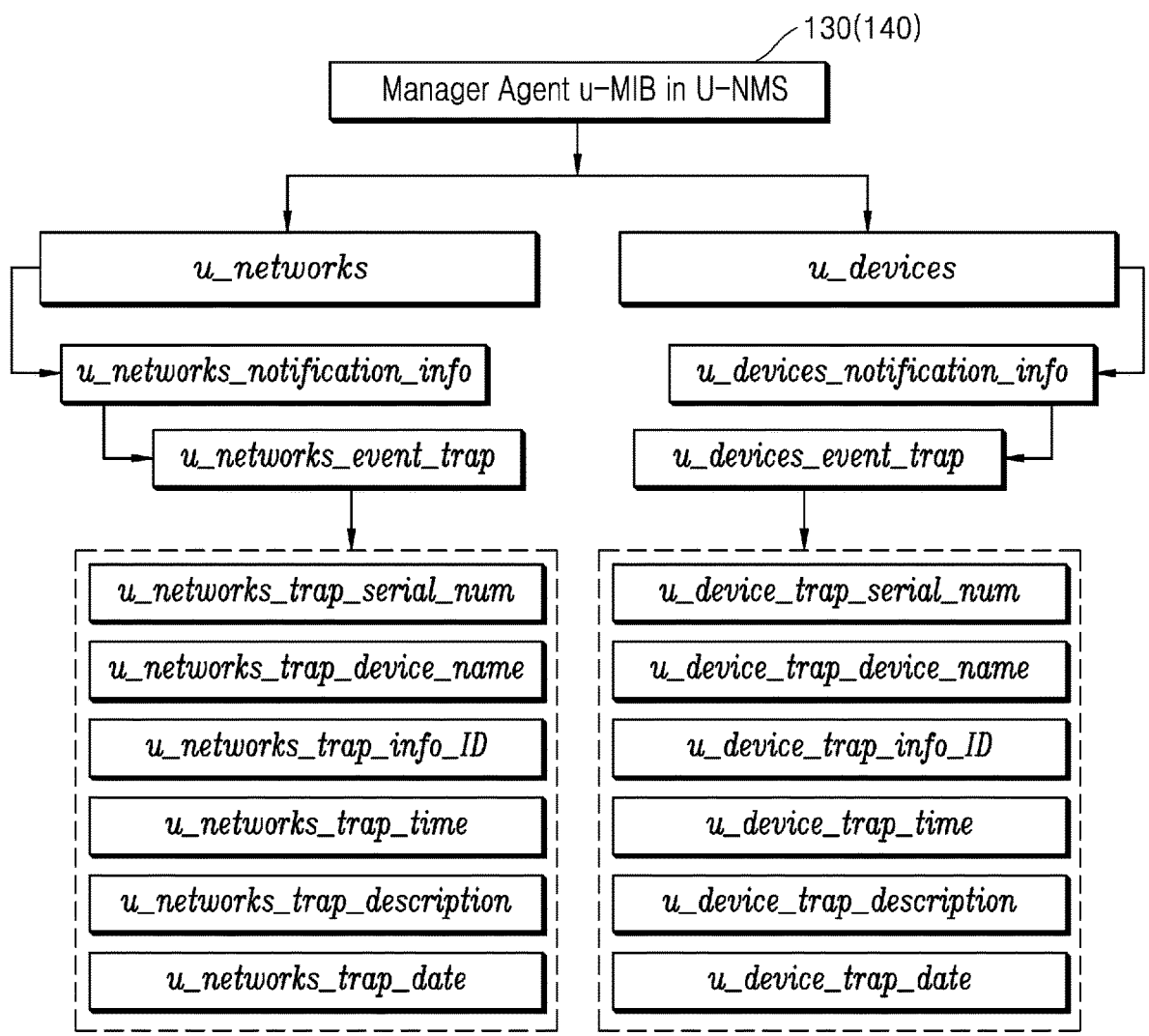

FIG. 8 shows examples of managed objects (MOs) for providing information about an event occurring in an underwater network or an underwater device to the manager 110.

Referring to FIG. 8, when an important event (a network or device error, etc.) occurs in an underwater network or an underwater device, the agent 120 may transmit a trap message (or packet) including managed objects (MOs) representing information about the occurred event to the manager 110. The management subject objects (MOs) representing information about the event may be included in the underwater network section (u_networks) and the underwater device section (u_devices), respectively. For example, the managed objects (MOs) may indicate information about serial numbers of devices where the event has occurred, a name of a device that transmits the trap message, a time when the event occurred, and a cause. The manager 110 may recognize the event occurring in the underwater network or the underwater device based on the managed objects (MOs) included in the trap message received from the agent 120, and may perform control and management of the underwater network or the underwater device according to a result of the recognition.

According to embodiments of FIGS. 4 to 8, the underwater network management system 100 may efficiently manage an underwater network and underwater devices through the underwater information management base (u-MIB) implemented in a form optimized for characteristics of the underwater network.

Hereinafter, referring to FIGS. 9 to 11, examples of an operation in which the underwater network management system 100 performs management of underwater devices according to an underwater information management base will be described in detail.

Figure 9:
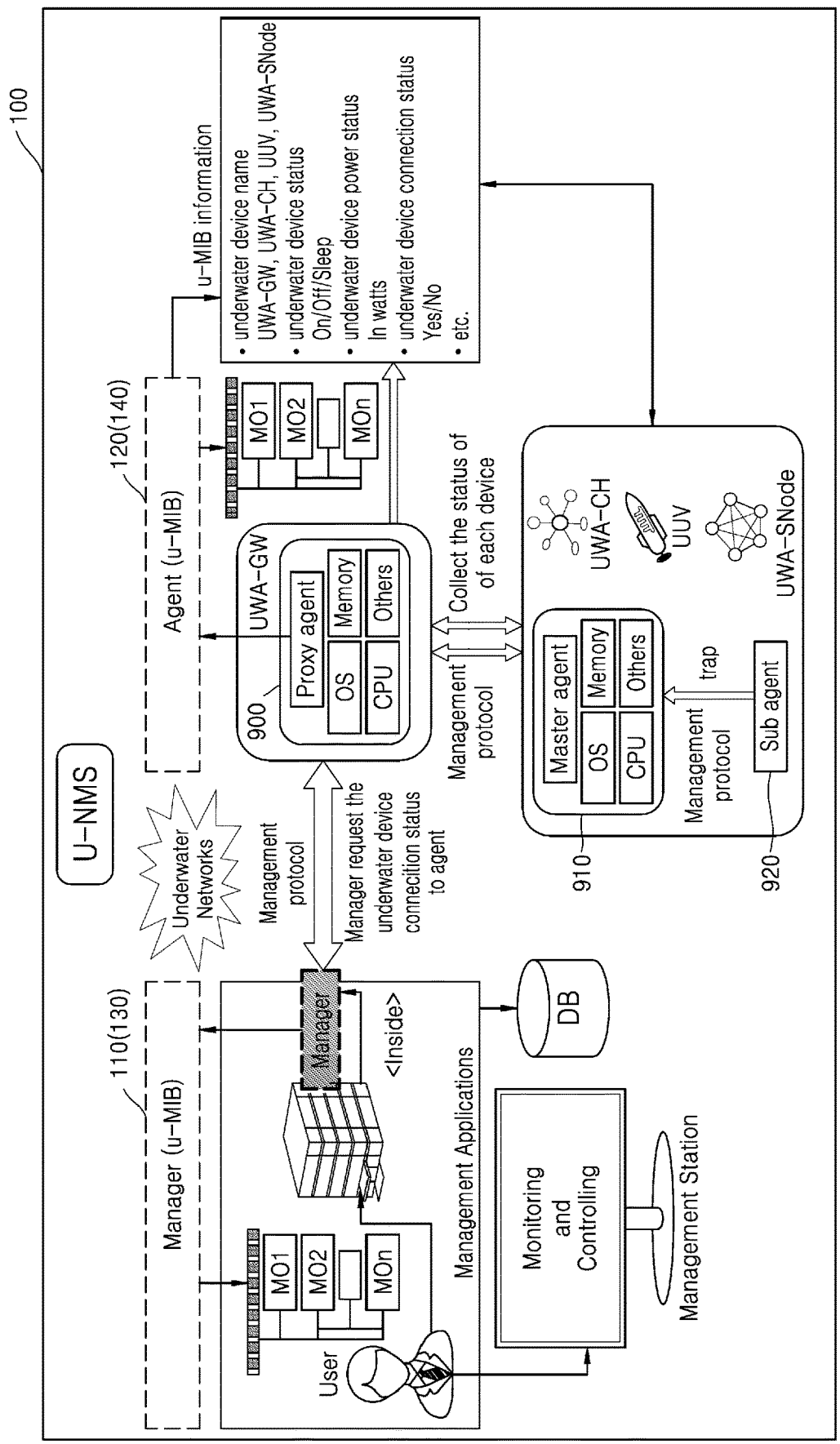
FIG. 9 is a conceptual diagram illustrating an operation of obtaining and managing information of underwater devices by an underwater network management system according to an exemplary embodiment of the present disclosure.

FIG. 9 is a conceptual diagram illustrating an operation of obtaining and managing information of underwater devices by an underwater network management system according to an exemplary embodiment of the present disclosure.

Referring to the embodiment of FIG. 9, the underwater network management system 100 may include the manager 110 and a plurality of agents 120, and the plurality of agents 120 may be classified into a proxy agent 900, a master agent 910, and a sub agent 920 according to connection relationship between underwater devices. The manager 110 may correspond to the management station 1, and the proxy agent 900 may correspond to the gateway 20. The sub agent 920 may correspond to an underwater device connected to an end of an underwater network, and the master agent 910 may correspond to an underwater device connected between the proxy agent 900 and the sub agent 920.

The manager 110 may obtain information (managed object) included in an underwater management information base of the master agent 910 or the sub agent 920 through the proxy agent 900, and may monitor status of an underwater device corresponding to the master agent 910 or an underwater device corresponding to the sub agent 920 based on the obtained information.

For example, the manager 110 may transmit a request message for information about connection status of underwater devices to the proxy agent 900. In response to the received request message, the proxy agent 900 may transmit a request message of connection status information to each of sub-connected agents (the master agent 910 and/or the sub agent 920). In response to the received request message, the master agent 910 and/or sub agent 920 may transmit a response message including managed objects related to connection status of an underwater device to the proxy agent 900 from among managed objects (MOs) included in each underwater management information base 140. For example, managed objects related to the connection status may be managed objects corresponding to information for identification of each underwater device (device name, etc.), information related to the status (operating status, battery status, etc.), and/or information about connection status (connection availability, network type, connection quality, etc.).

The manager 110 may receive a response message including managed objects from the proxy agent 900, and may monitor connection status of underwater devices based on the received response message. In addition, the manager 110 may update the underwater management information base 130 of the manager 110 based on the managed objects included in the received response message. The proxy agent 900 may also update an underwater management information base based on managed objects received from the master agent 910 and/or the sub agent 920.

Figure 10:
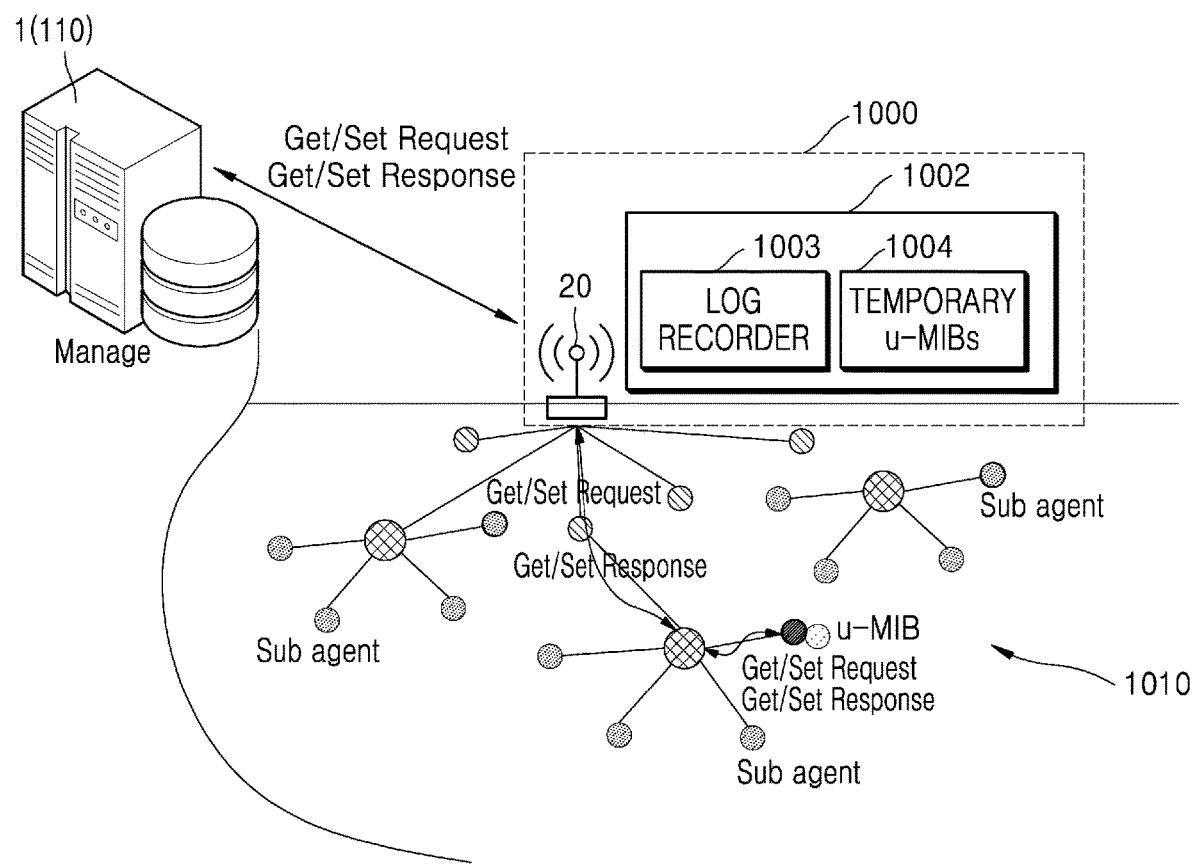
FIG. 10 is a conceptual diagram illustrating an operation of obtaining and managing information of underwater devices by an underwater network management system according to an exemplary embodiment of the present disclosure.

FIG. 10 is a conceptual diagram illustrating an operation of obtaining and managing information of underwater devices by an underwater network management system according to an exemplary embodiment of the present disclosure.

Referring to FIG. 10, the underwater network management system 100 may include the manager 110 corresponding to the management station 1 and agents, wherein the agents may include a proxy agent 1000 and a plurality of sub agents 1010 connected to the proxy agent 1000. For example, the proxy agent 1000 may correspond to the gateway 20, and a sub agent 1010 may correspond to each of a plurality of underwater devices.

Similar to the embodiment of FIG. 9, the manager 110 may transmit, to the proxy agent 1000, a message requesting information for management or status monitoring of an underwater network and/or underwater devices. In response to the received information request message, the proxy agent 1000 may transmit the information request message to at least some of the sub agents 1010 related to the information request message from among sub-connected sub agents 1010. Upon receiving the information from at least some of the sub agents 1010, the proxy agent 1000 may transmit a response message including the received information to the manager 110.

Because the underwater environment is more variable and more difficult to predict than the terrestrial environment, underwater communication is less reliable than terrestrial communication. Accordingly, when the proxy agent 1000 receives a request message from the manager 110, the proxy agent 1000 may not be normally connected to some of the sub agents 1010 depending on the underwater environment. In this case, because the proxy agent 1000 has to wait until the proxy agent 1000 receives information from sub agents 1010 that are not connected to the proxy agent 1000, a response to the manager 110 may be delayed. In addition, due to the sub agents 1010 that are not connected to the proxy agent 1000, even information received from the sub agents 1010 connected to the proxy agent 1000 cannot be immediately transmitted, resulting in inefficiency.

According to an embodiment of the present disclosure, the proxy agent 1000 may include temporary management information bases 1004 corresponding to respective management information bases of the sub agents 1010. The temporary management information bases 1004 may be included in a storage 1002 of the proxy agent 1000.

The proxy agent 1000 including the temporary management information bases 1004 may have a kind of cloud shape. Each of the sub agents 1010 may transmit a response message including information (a managed object) to the proxy agent 1000 based on a request message received from the proxy agent 1000, or may transmit a trap message including a related managed object to the proxy agent 1000 when a specific event occurs. The proxy agent 1000 may update a temporary management information base corresponding to a specific sub agent by using a managed object included in a response message or trap message from the specific sub agent. In this case, the storage 1002 may further include a log recorder 1003 for each of the sub agents 1010, and the log recorder 1003 may record information about a time when a response message or trap message is received (or information about the update timing of the temporary management information base) for each of the sub agents 1010.

As the temporary management information bases 1004 are implemented, response delay from the proxy agent 1000 to the manager 110 may be minimized. This will be described in more detail with reference to FIG. 11 below.

Figure 11:
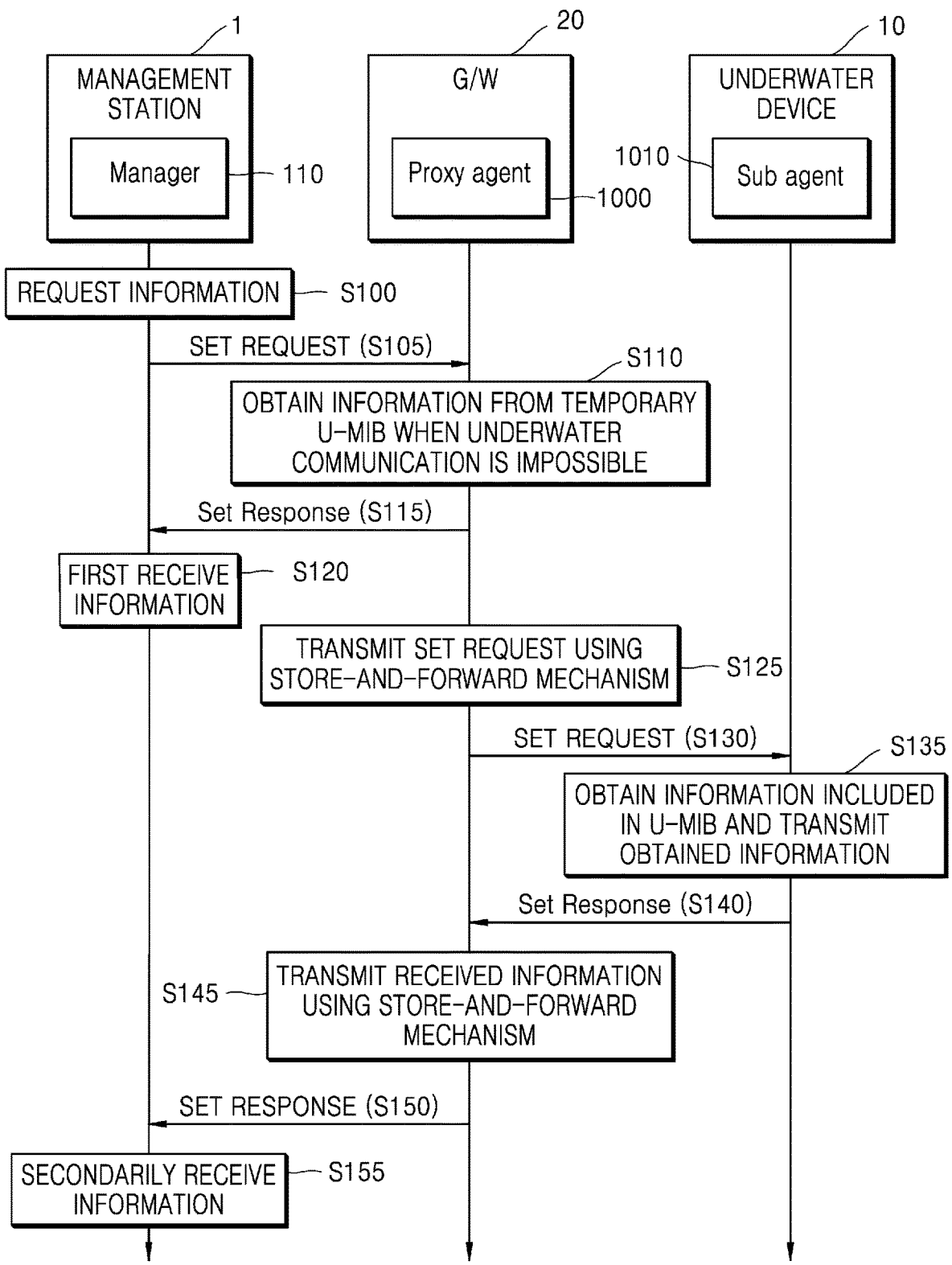
FIG. 11 is a ladder diagram for explaining a specific example related to a management information transmission/reception operation of the underwater network management system according to the embodiment of FIG. 10.

FIG. 11 is a ladder diagram for explaining a specific example related to a management information transmission/reception operation of the underwater network management system according to the embodiment of FIG. 10.

Referring to FIG. 11, in operation S100, the manager 110 corresponding to the management station 1 may request information for management or status monitoring of an underwater network or underwater device. To this end, in operation S105, the manager 110 may transmit a request message (Set Request) to the proxy agent 1000 corresponding to the gateway 20.

Upon receiving the request message, the proxy agent 1000 may obtain information to be transmitted to the manager 110 based on communication status, and may transmit a response message including the obtained information to the manager 110.

Although not shown, when underwater communication between the proxy agent 1000 and the sub agent 1010 is possible, the proxy agent 1000 may transmit a request message to the sub agent 1010 and receive a response message including the information from the sub agent 1010. The proxy agent 1000 may transmit the received response message including the information to the manager 110.

According to an embodiment, when communication connection between the proxy agent 1000 and the manager 110 is not smooth, the proxy agent 1000 may wait without transmitting a response message to the manager 110. The proxy agent 1000 may transmit the response message to the manager 110 after a preset waiting time or when detecting that the communication connection becomes smooth.

In operation S110, when underwater communication between the proxy agent 1000 and the sub agent 1010 is impossible, the proxy agent 1000 may obtain information stored in a temporary underwater management information base.

The expression that underwater communication is impossible may mean a state in which connection between devices is disconnected or a state in which the communication environment is below a preset level (e.g., transmission delay and/or a bit error rate (BER) exceeds a threshold, etc.).

For example, among the plurality of sub agents 1010, a first sub agent may be in a state in which underwater communication with the proxy agent 1000 is possible, and a second sub agent may be in a state in which underwater communication with the proxy agent 1000 is impossible. In this case, the proxy agent 1000 may obtain information to be transmitted from the first sub agent to the manager 110, and may obtain information from a temporary underwater management information base corresponding to the second sub agent from among temporary underwater management information bases.

In operation S115, the proxy agent 1000 may transmit a response message (e.g., Set Response) including the received information to the manager 110, and in operation S120, the manager 110 may first receive requested information by receiving the response message.

In operations S125 and S130, the proxy agent 1000 may transmit a request message (e.g., Set Request) to the sub agent 1010 that has not obtained information using a store-and-forward mechanism.

As described above, the proxy agent 1000 may obtain information about the second sub agent in a state in which underwater communication is impossible from the temporary underwater management information base and transmit the information to the manager 110. Thereafter, the proxy agent 1000 may store the request message in a memory such as a buffer, and may transmit the request message to the second sub agent after a preset time elapses. In this case, when underwater communication between the proxy agent 1000 and the second sub agent is still impossible, the proxy agent 1000 may transmit the request message to the second sub agent after the additional elapse of the preset time.

According to an embodiment, the request message may be transmitted not only to the second sub agent that has not obtained information, but also to the first sub agent that has previously obtained information.

In operations S135 and S140, upon receiving the request message from the proxy agent 1000, the sub agent 1010 (e.g., the second sub agent) may obtain information included in an underwater management information base of the sub agent 1010, and may transmit the response message (Set Response) including the obtained information to the proxy agent 1000.

In operations S145 and S150, the proxy agent 1000 may transmit a response message including information received from the sub agent 1010 to the manager 110 using a store-and-forward mechanism.

The proxy agent 1000 may store response messages received from sub agents in a memory such as a buffer according to a store-and-forward mechanism. The proxy agent 1000 may store previously received response messages until response messages are received from all sub agents to which request messages are transmitted in operations S125 and S130. When response messages are received from all sub agents to which request messages are transmitted, the proxy agent 1000 may transmit a response message having information included in the received response messages to the manager 110.

Although not shown, the proxy agent 1000, by storing information received from the sub agent 1010 in a temporary underwater management information base corresponding to the sub agent 1010, may update the temporary underwater management information base and/or an underwater management information base of the proxy agent 1000. Accordingly, information synchronization may be performed between the underwater management information base of the proxy agent 1000, the temporary underwater management information base, and the underwater management information base of the sub agent 1010.

In operation S155, the manager 110 may secondarily receive the information requested in operation S100 by receiving the response message transmitted from the proxy agent 1000.

According to the second reception of the above information, synchronization between an underwater management information base of the manager 110, the underwater management information base of the proxy agent 1000, and the underwater management information base of the sub agent 1010 may be achieved.

According to the conventional store-and-forward mechanism, until all information (data) to be transmitted to the manager 110 is obtained, the proxy agent 1000 may not be able to transmit a response message to the manager 110. In this case, the transmission delay of information may be unnecessarily increased, and inefficiency may occur in that the remaining information may not be transmitted due to some unreceived information. In particular, in the case of underwater communication, because the degree of change in the underwater environment is greater than that of the terrestrial environment, and the communication status is unstable compared to that of the terrestrial environment, information transmission delay may occur very frequently according to the conventional store-and-forward mechanism.

According to the embodiment of FIG. 11, when underwater communication with some sub agents is not smooth, the proxy agent 1000 may primarily transmit a response message including information stored in a temporary management information base to the manager 110, and may secondarily transmit a response message including information obtained as underwater communication with the sub agents becomes smooth to the manager 110 later. Accordingly, overall delay when the proxy agent 1000 transmits information to the manager 110 may be minimized.

The underwater network management system 100 may include at least one underwater network. For example, each of the at least one underwater network may be divided into a certain space unit, and underwater agents (master agents and/or sub agents) existing in the same unit space may form one underwater network.

Because some (e.g., UUV, AUV, etc.) of the agents have mobility, they may move from a specific unit space to another unit space as needed. Alternatively, some agents may be moved from a specific unit space to another unit space by the influence of a current or the like. In this case, the agents moved to the other unit space needs to be registered in an underwater network formed in the other unit space to facilitate communication. An implementation example of an underwater management information base reflecting the mobility of such an agent (node) and embodiments of a network management operation using the same will be described with reference to FIGS. 12 to 17.

Figure 12:
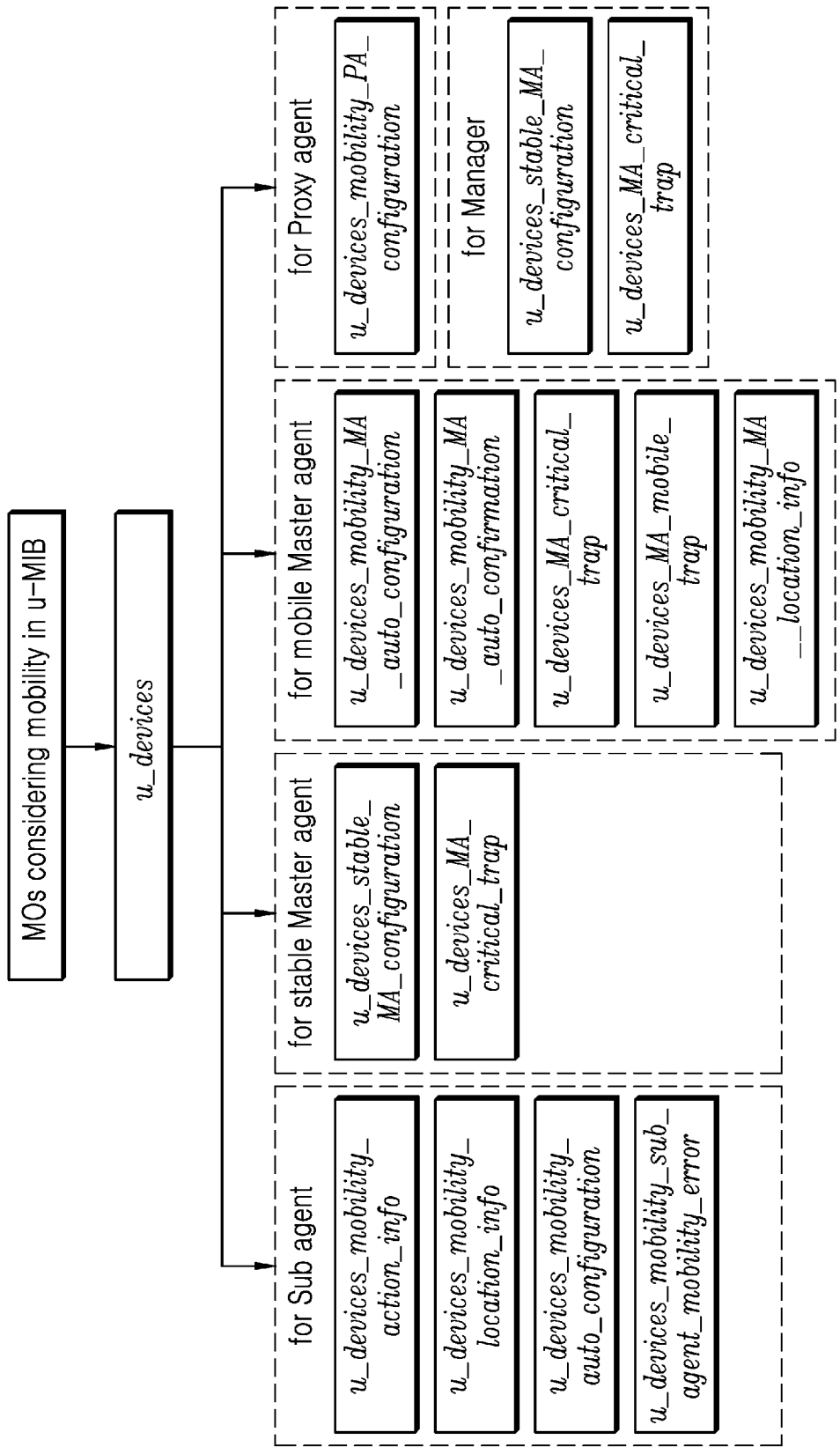
FIG. 12 is a view illustrating examples of managed objects implemented for management of information related to agent mobility.

FIG. 12 is a view illustrating examples of managed objects implemented for management of information related to agent mobility.

Referring to FIG. 12, the managed object (MO) related to mobility may be provided differently according to the type or property of an agent. For example, the managed object (MO) related to mobility may be implemented differently for each of a sub agent, a fixed master agent, a master agent with mobility, a proxy agent, and a manager.

The managed object (MO) related to mobility may be included in the underwater device section (u_devices), and contents of respective managed objects are shown in Tables 7 to 11 below.

TABLE 7

| MOs considering mobility for sub agent | | |
| --- | --- | --- |
| Group name | MOs | Description |
| u_devices_mobility_action_info | u_devices_mobility_action_start | It indicates the sub agent started moving from its old position. |
| | u_devices_mobility_action_moving | It indicates the sub agent is currently moving. |
| | u_devices_mobility_action_stop | It indicates the sub agent stop moving. |
| | u_devices_mobility_action_distance_moved | It indicates the distance between the old position and the new position of sub agent. |
| u_devices_mobility_location_info | u_devices_mobility_SA_old_location | It indicates the old position of sub agent in U-NMS. |
| | u_devices_mobility_SA_new_location | It indicates the new position of a sub agent in the U-NMS. |
| u_devices_mobility_auto_configuration | u_devices_mobility_change_identified | It indicates the changes in sub agent such as start moving, still moving, and stop moving. |
| | u_devices_mobility_change_auto_update | It automatically updates and fixes the new position of sub agent in sub agent. |
| | u_devices_mobility_change_notify | Sub agent notifies the changes in position to master agent 1 and master agent 2. Notify the changes in position from position 1 to position 2 to master agent 1 and master agent 2. |
| u_devices_sub_agent_mobility_error (critical events of sub agent) | u_devices_mobility_SA_battery_low | The sub agent sends the trap message to the master agent, that shows the reason for mobility error (battery low is the reason for mobility problem in sub agent). |
| | u_devices_mobility_SA_hardware_fault | It indicates the hardware fault in sub agent to the master agent. So, the sub agent is not moving. |
| | u_devices_mobility_SA_connectivity_fault | It indicates the connectivity problem of sub agent to the master agent. |
| | u_devices_mobility_SA_memory_fault | It indicates the memory problem of sub agent to the master agent. So, the sub agent cannot be updated due to a memory error. |

Referring to an embodiment of Table 7, managed objects implemented in sub agents in relation to mobility may manage various types of information, such as movement-related information (moving start, moving, stopping, moving distance, etc.), location information (previous location, latest location, etc.), and movement-related event information (inability to move due to low battery or hardware failure, network connection failure, etc.).

TABLE 8

MOs considering mobility for stable Master agent

| Group name | MOs | Description |
| --- | --- | --- |
| u_devices_stable_MA_configuration | u_devices_mobility_total_connected | It indicates the total number of sub agents connected under master agent 1 and master agent 2. |
| | u_devices_mobility_change_detection | Master agent identifies the changes in the position of sub agent from network 1 to network 2. It identifies the new sub agent is discovered by master agent 1 or master agent 2 under network 1 or network 2. |
| | u_devices_mobility_change_addition | It adds the new sub agent to master agent 1 or master agent 2 which is discovered under network 1 or network 2. |
| | u_devices_mobility_change_update | It updates the addition of new sub agent to master agent 1 and master agent 2. |
| | u_devices_mobility_change_notify | Master agent 1 and master agent 2 notifies the changes to the proxy agent. |
| u_devices_MA_critical_trap | u_devices_mobility_MA_battery_low | The master agent sends the critical trap message to the proxy agent. The error is due to a low battery problem in the master agent. |
| | u_devices_mobility_MA_hardware_fault | It indicates the hardware fault in master agent to the proxy agent. So, the master agent cannot function more. |
| | u_devices_mobility_MA_connectivity_fault | It indicates the connectivity problem between the master agent and proxy agent. |
| | u_devices_mobility_MA_memory_fault | It indicates the memory problem of the master agent to proxy agent. Therefore, the master agent updating process is stopped. |

Referring to an embodiment of Table 8, managed objects implemented in a fixed master agent may manage information such as information related to connected sub agents (number of connected sub agents, movement detection, additional detection, etc.) and event information (low battery, bad hardware, connection failure with proxy agent, etc.).

TABLE 9

MOs considering mobility for mobile Master agent

| Group name | MOs | Description |
| --- | --- | --- |
| u_devices_mobility_MA_auto_configuration | u_devices_mobility_MA_change_identified | It indicates the changes in master agent such as start moving, still moving, and stop moving. |

TABLE 9-continued

MOs considering mobility for mobile Master agent

| Group name | MOs | Description |
|---|---|---|
| | u_devices_mobility_MA_change_addition | It indicates that the new master agent is moved under another master agent. That means master agent 1 moved from network 1 to network 2. |
| | u_devices_mobility_MA_change_auto_update | It automatically updates and fixes the new position of master agent in master agent. |
| | u_devices_mobility_SA_convertion | It converts the newly added master agent to sub agent. |
| | u_devices_mobility_MA_convertion | It converts the existing sub agent to master agent based on battery availability. |
| | u_devices_mobility_SA_change_notify | Master agent notifies the conversion of the master agent to sub agent to proxy agent 1 and proxy agent 2. |
| | u_devices_mobility_SA_update_objects | The proxy agent and master agent will update the MOs of the newly formed sub agent. |
| | u_devices_mobility_MA_change_notify | Master agent notifies the conversion of the sub agent to master agent to proxy agent 1 and proxy agent 2. |
| | u_devices_mobility_MA_update_objects | The proxy agent will update the MOs of the newly formed master agent. |
| u_devices_mobility_MA_auto_confirmation | u_devices_mobility_MA_send_request | The newly formed master agent will send the request to all sub agent for confirmation. |
| | u_devices_mobility_SA_send_response | The sub agent will send the ack message. This message will make the connection between the newly formed master agent and sub agents. |
| u_devices_MA_critical_trap | u_devices_mobility_MA_battery_low | The master agent sends the critical trap message to the proxy agent. The error is due to a low battery problem in the master agent. |
| | u_devices_mobility_MA_hardware_fault | It indicates the hardware fault in master agent to the proxy agent. So, the master agent cannot function more. |
| | u_devices_mobility_MA_connectivity_fault | It indicates the connectivity problem between the master agent and proxy agent. |
| | u_devices_mobility_MA_memory_fault | It indicates the memory problem of the master agent to proxy agent. Therefore, the master agent updating process is stopped. |
| u_devices_MA_mobile_trap | u_devices_mobility_MA_action_start | It indicates the master agent started moving from its old position. |
| | u_devices_mobility_MA_action_moving | It indicates the master agent is currently moving. |
| | u_devices_mobility_MA_action_stop | It indicates the master agent stop moving. |

TABLE 9-continued

MOs considering mobility for mobile Master agent

| Group name | MOs | Description |
|---|---|---|
| | u_devices_mobility_MA_action_disctance_moved | It indicates the distance between the old position and the new position of the master agent. |
| u_devices_mobility_MA_location_info | u_devices_mobility_MA_old_location | It indicates the old position of master agent in U-NMS. |
| | u_devices_mobility_MA_new_location | It indicates the new position of a master agent in the U-NMS. |

Referring to an embodiment of Table 9, managed objects implemented in a movable master agent may manage various types of information, such as information related to the movement of a master agent, information for network configuration according to the movement of the master agent, and event information generated in relation to the movement.

TABLE 10

MOs considering mobility for proxy agent (Gateway)

| Group name | MOs | Description |
|---|---|---|
| u_devices_mobility_PA_configuration | u_devices_mobility_MA_connected | It indicates the master agent is connected with proxy agent 1 or proxy agent 2. |
| | u_devices_mobility_change_MA_received | It receives the changes reported by the master agent. |
| | u_devices_mobility_change_MA_update | It updates the changes reported by mater agent 1 or master agent 2 to the proxy agent 1 and proxy agent 2. |
| | u_devices_mobility_change_MA_notify | proxy agent 1 or proxy agent 2 notifies the changes to the manager. Also, the updated information is shared between the proxy agent 1 and proxy agent 2. |
| | u_devices_mobility_change_MA_auto_correction | It will try to automatically update and correct the software faults that occur in the proxy agent. |

Referring to an embodiment of Table 10, managed objects implemented in a proxy agent may manage various information for reconfiguring an underwater network according to the movement of a master agent and/or a sub agent.

TABLE 11

MOs considering mobility for Manager

| Group name | MOs | Description |
|---|---|---|
| u_devices_mobility_location_info | u_devices_mobility_location_old_position | It indicates the old position of node in U-NMS. |
| | u_devices_mobility_location_new_position | It indicates the new position of the node in the U-NMS. |

TABLE 11-continued

MOs considering mobility for Manager

| Group name | MOs | Description |
| --- | --- | --- |
| | u_devices_mobility_location_location_update | It updates the location information in the manager base on the information sent by the proxy agent 1 or proxy agent 2. |
| u_devices_mobility_network_info | u_devices_mobility_network_device_connected | It indicates the total number of devices connected in U-NMS such as proxy agent, the master agent, and sub agent. |
| | u_devices_mobility_network_receive_notification | It receives the notification from the proxy agent. |
| | u_devices_mobility_network_auto_update | It automatically updates the information in manager u-MIB based on the changes received from proxy agent. |
| | u_devices_mobility_network_adaptation u_devices_mobility_network_scalability | It is used to automatically adapt the changes that appear in network 1 or network 2. For example, sub agent was moved from network 1 to network 2. |

Referring to an embodiment of Table 11, managed objects implemented in a manager may manage location information of agents, information related to an underwater network reconfigured according to the movement of a master agent and/or a sub agent, and the like.

Figure 13:
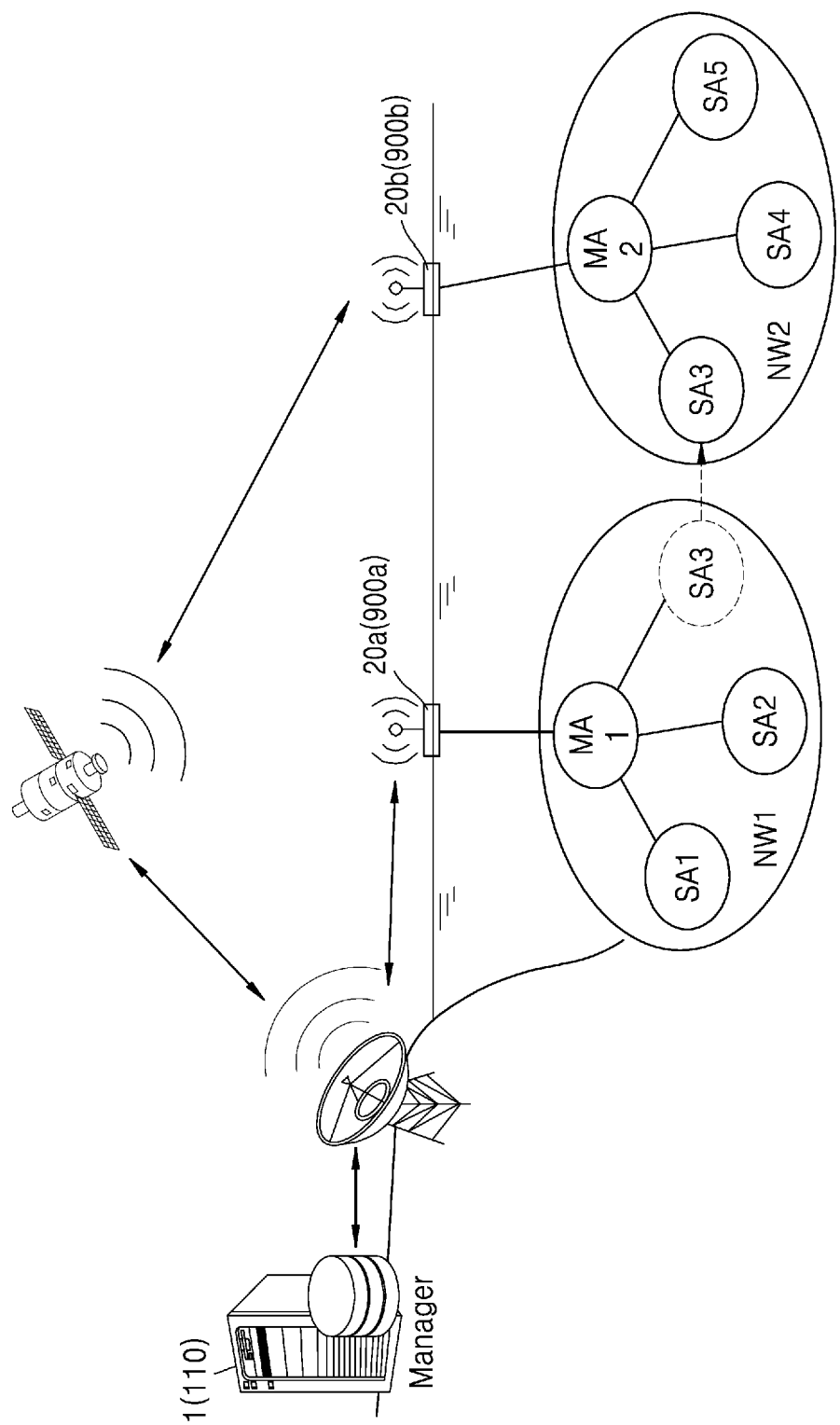
FIGS. 13 and 14 are views for explaining an underwater network management operation as an underwater device corresponding to a sub agent moves from a space corresponding to a first underwater network to a space corresponding to a second underwater network.
Figure 14:
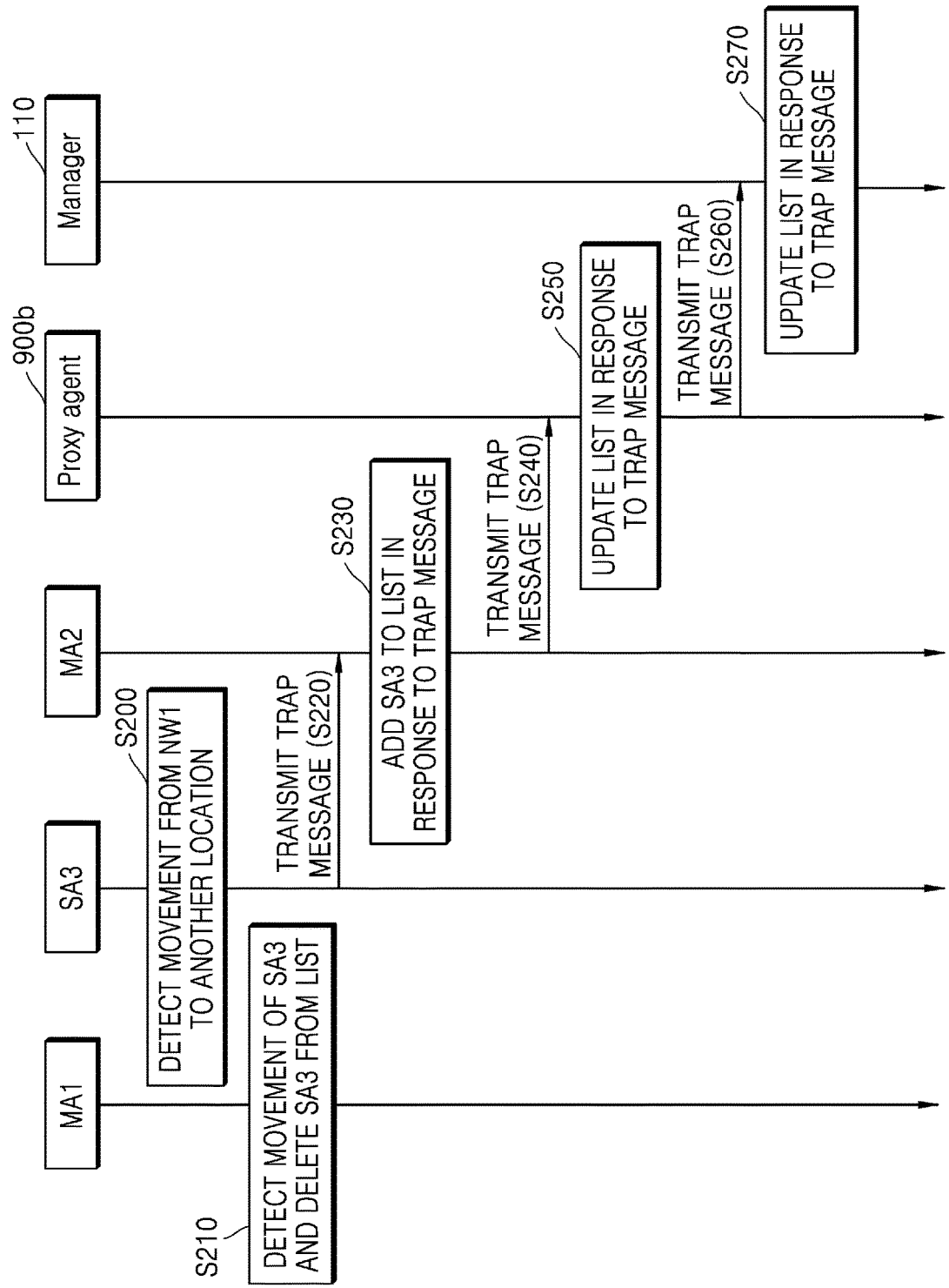

FIGS. 13 and 14 are views for explaining an underwater network management operation as an underwater device corresponding to a sub agent moves from a space corresponding to a first underwater network to a space corresponding to a second underwater network.

Referring to FIG. 13, the underwater network management system 100 may include the manager 110 corresponding to the management station 1 and agents. The agents may include one or more proxy agents 900a and 900b, master agents MA1 and MA2 connected to the proxy agents 900a and 900b, and sub agents SA1 to SA5 connected to the master agents MA1 and MA2. For example, the proxy agents 900a and 900b may correspond to the gateway 20, and each of the master agents MA1 and MA2 and the sub agents SA1 to SA5 may correspond to an underwater device. FIG. 13 shows that the master agents MA1 and MA2 are connected to the proxy agents 900a and 900b, respectively, but a plurality of master agents may be connected to each of the proxy agents 900a and 900b according to an embodiment.

The master agents MA1 and MA2 may configure underwater networks NW1 and NW2 together with connected sub agents, respectively. For example, the first underwater network NW1 may include the first master agent MA1 and the sub agents SA1, SA2, and SA3 connected to the first master agent MA1. The second underwater network NW2 may include the second master agent MA2 and the sub agents SA4 and SA5 connected to the second master agent MA2.

A space corresponding to an underwater network may be defined by the manager 110 or the proxy agent 900. In this case, any one of underwater devices located in the same space may be set as a master agent, and other devices may be set as sub agents. According to an embodiment, the space corresponding to the underwater network may correspond to a communicable distance (or a distance at which communication performance remains above standard performance) with a master agent of a corresponding underwater network.

Among underwater devices, AUV, UUV, ROV, etc. may have mobility. For example, among underwater devices having such mobility, an underwater device corresponding to a sub agent (the third sub agent SA3) may move from a location in a space corresponding to the first underwater network NW1 to a location in a space corresponding to the second underwater network NW2. As the sub agent SA3 moves to the space corresponding to the second underwater network NW2, the sub agent SA3 may not be able to communicate normally with the first master agent MA1. In this case, because the sub agent SA3 may be blocked from transmitting/receiving information with the outside (the manager, etc.), and the manager 110 cannot receive status information of the sub agent SA3, normal management of the sub agent SA3 may be impossible. Alternatively, the sub agent SA3 may communicate with the first master agent MA1 even in the space corresponding to the second underwater network NW2. However, communication by being connected to the second master agent MA2 of the second underwater network NW2 may be effective in terms of communication quality or power consumption.

According to an embodiment of the present disclosure, the underwater network management system 100 may prevent the problems described above by actively reconfiguring an underwater network when the movement of a sub agent is detected.

FIG. 14 shows an embodiment of an underwater network management operation upon detecting the movement of a sub agent. Referring to FIG. 14, in operation S200, a sub agent (e.g., the third sub agent SA3) may detect movement from a location in a space corresponding to the first underwater network NW1 to another location.

An underwater device (e.g., AUV, etc.) corresponding to the sub agent SA3 may move according to driving of a driving unit such as a motor (not shown). Based on the driving of the driving unit, the sub agent SA3 may detect movement to another location, and may update the managed objects related to mobility described above in FIG. 10 from among the managed objects (MOs) of the underwater management information base (u-MIB) based on movement status, movement distance, and the like.

The sub agent SA3 may detect departure from the space corresponding to the first underwater network NW1 based on a detected movement distance, a detected location, or whether communication with a previously connected master agent (e.g., the first master agent MA1) is possible.

In operation S210, as the movement of the sub agent SA3 is detected, the master agent MA1 may delete the moved sub agent SA3 from a list of sub agents included in the first underwater network NW1.

The master agent MA1 may detect the movement of the sub agent SA3 through a communication device or a sensor. Alternatively, the master agent MA1 may receive a managed object representing information related to mobility from the sub agent SA3, and may detect the movement of the sub agent SA3 based on information included in the received managed object. For example, when the master agent MA1 detects that the moving sub agent SA3 is out of the space corresponding to the first underwater network NW1 or communication with the sub agent SA3 becomes impossible (or when communication performance is lower than standard performance), the sub agent SA3 may be deleted from a list of sub agents (SA1, SA2, etc.) constituting the first underwater network NW1. As the sub agent SA3 is deleted, the first underwater network NW1 may be reconfigured with the first master agent MA1, the first sub agent SA1, and the second sub agent SA2.

Although not shown, according to an embodiment, based on a result of the reconfiguration of the first underwater network NW1, the master agent MA1 may update a managed object related to mobility from among managed objects included in an underwater management information base of the master agent MA1. For example, the master agent MA1 may update a managed object indicating information about "the number of connected sub agents" from among the managed objects. Thereafter, the master agent MA1 may transmit the updated managed object according to a request of the proxy agent 900a or the manager 110, or may transmit a trap message including the updated managed object to the proxy agent 900a.

Upon detecting departure from the space corresponding to the first underwater network NW1, the sub agent SA3 may perform an operation to be registered in an underwater network corresponding to another master agent. For example, when communication with the first master agent MA1 is not normally performed for a certain time or longer after moving a certain distance, the sub agent SA3 may perform an operation to be registered in an underwater network corresponding to another master agent.

In operation S220, the sub agent SA3 may transmit (output) a trap message for connection with another master agent.

For example, the sub agent SA3 may not be aware of information about a location of another master agent. Accordingly, the sub agent SA3 may broadcast the trap message using underwater communication methods (sound waves, visible light, infrared rays, magnetic fields, low frequencies, etc.) implemented in an underwater device. The trap message may include information about the sub agent SA3 (serial number, device name, etc.).

According to an embodiment, when the sub agent SA3 includes information about a space corresponding to the second underwater network NW2 and/or information about the master agent MA2 located in the second underwater network NW2, based on a moved location, the sub agent SA3 may recognize that the current sub agent SA3 corresponds to the space corresponding to the second underwater network NW2. According to a result of the recognition, the sub agent SA3 may transmit a trap message for connection with the second master agent MA2 of the second underwater network NW2.

As the sub agent SA3 outputs a trap message at a location in the space corresponding to the second underwater network NW2, the second master agent MA2 of the second underwater network NW2 may receive the trap message. In operation S230, the second master agent MA2 may register the sub agent SA3 in the second underwater network NW2 by adding the sub agent SA3 to a list in response to the received trap message.

The second master agent MA2 may identify the sub agent SA3 in response to the received trap message and add the identified sub agent SA3 to the list. Accordingly, the list corresponding to the second master agent MA2 may include pre-registered sub agents SA4 and SA5 and the added sub agent SA3. In addition, the second master agent MA2 may add the sub agent SA3 to the second underwater network NW2 by being connected to the sub agent SA3.

Although not shown, the second master agent MA2 may transmit a message including at least some of managed objects included in an underwater management information base of the second master agent MA2 to the sub agent SA3. The sub agent SA3 may communicate with the second master agent MA2 by updating the underwater management information base based on the received message.

In operation S240, the second master agent MA2 may transmit a trap message for notifying the proxy agent 900b that the sub agent SA3 is registered in the second underwater network NW2.

For example, the trap message may be generated by including at least a part of information of the trap message received from the sub agent SA3. According to an embodiment, the second master agent MA2 may transmit the trap message received from the sub agent SA3 to the proxy agent 900b.

In operation S250, the proxy agent 900b may update a list corresponding to the proxy agent 900b in response to the received trap message.

The list may include information about at least one master agent connected to the proxy agent 900b and sub agents connected to the at least one master agent.

As illustrated in FIG. 13, information about the sub agent SA3 added to the second underwater network NW2 may not exist in the list of proxy agent 900b. In this case, the proxy agent 900b may add information about the sub agent SA3 to the list in response to the received trap message.

According to an embodiment, unlike FIG. 13, when the first master agent MA1 and the second master agent MA2 are connected to an identical proxy agent (e.g., 900b), the list of proxy agents 900b may include information about the sub agent SA3 registered as being included in the first underwater network NW1. In this case, the proxy agent 900b may update the list to indicate that sub agent SA3 is included in the second underwater network NW2.

Similar to operation S240, in operation S260, the proxy agent 900b may transmit a trap message for notifying the manager 110 that the sub agent SA3 is registered in the second underwater network NW2. In operation S270, the manager 110 may update a list corresponding to the manager 110 in response to the received trap message.

The list of the manager 110 may include information about the sub agent SA3 registered as being included in the first underwater network NW1. In response to the received trap message, the manager 110 may update the list to indicate that the sub agent SA3 is included in the second underwater network NW2.

Accordingly, the sub agent SA3, which has moved to the space corresponding to the second underwater network NW2, is registered in the second underwater network NW2 and may continuously perform smooth communication with another underwater device and the management station 1 on the ground.

Figure 15:
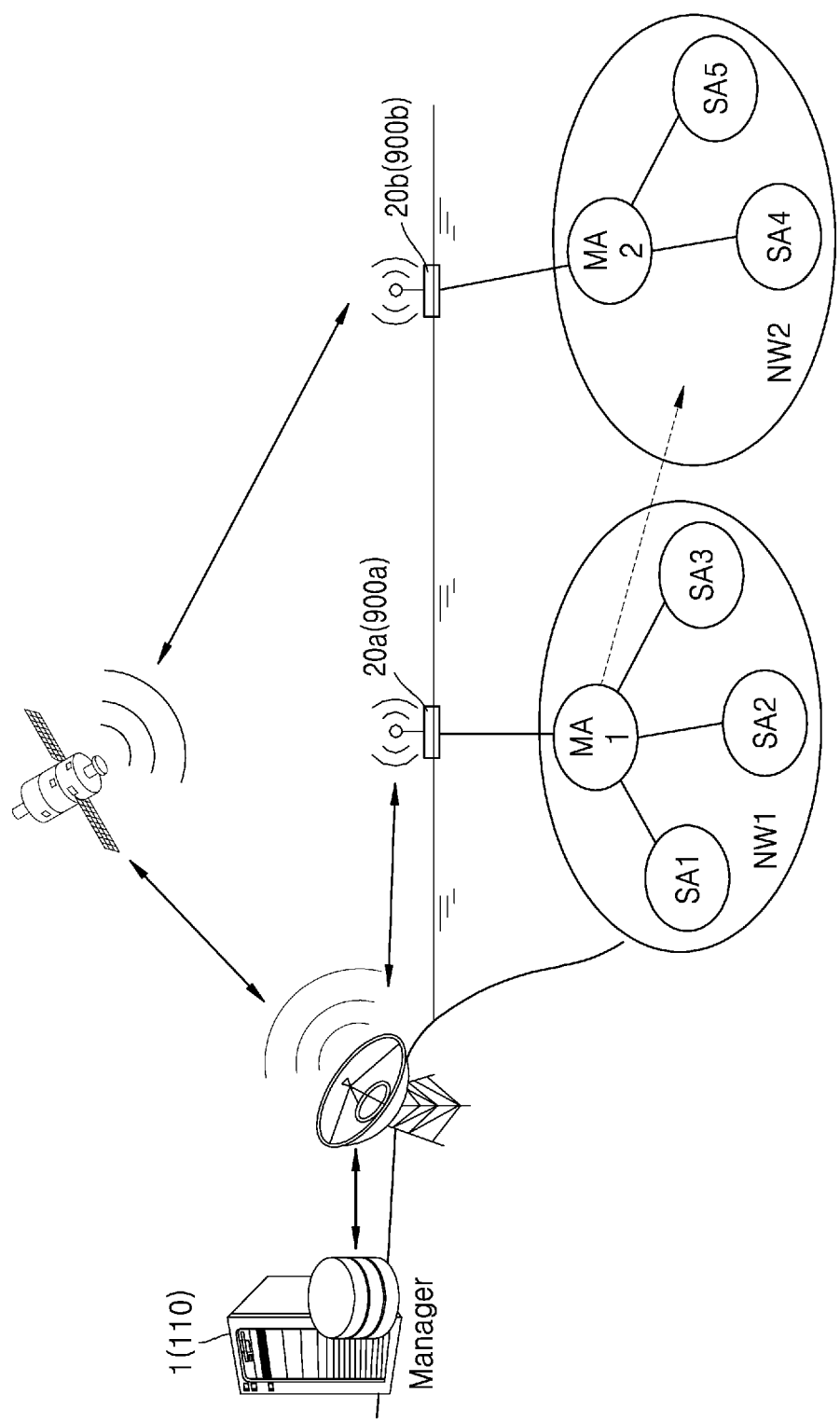
FIGS. 15 to 17 are views for explaining an underwater network management operation as an underwater device corresponding to a master agent moves from a space corresponding to a first underwater network to a space corresponding to a second underwater network.
Figure 16:
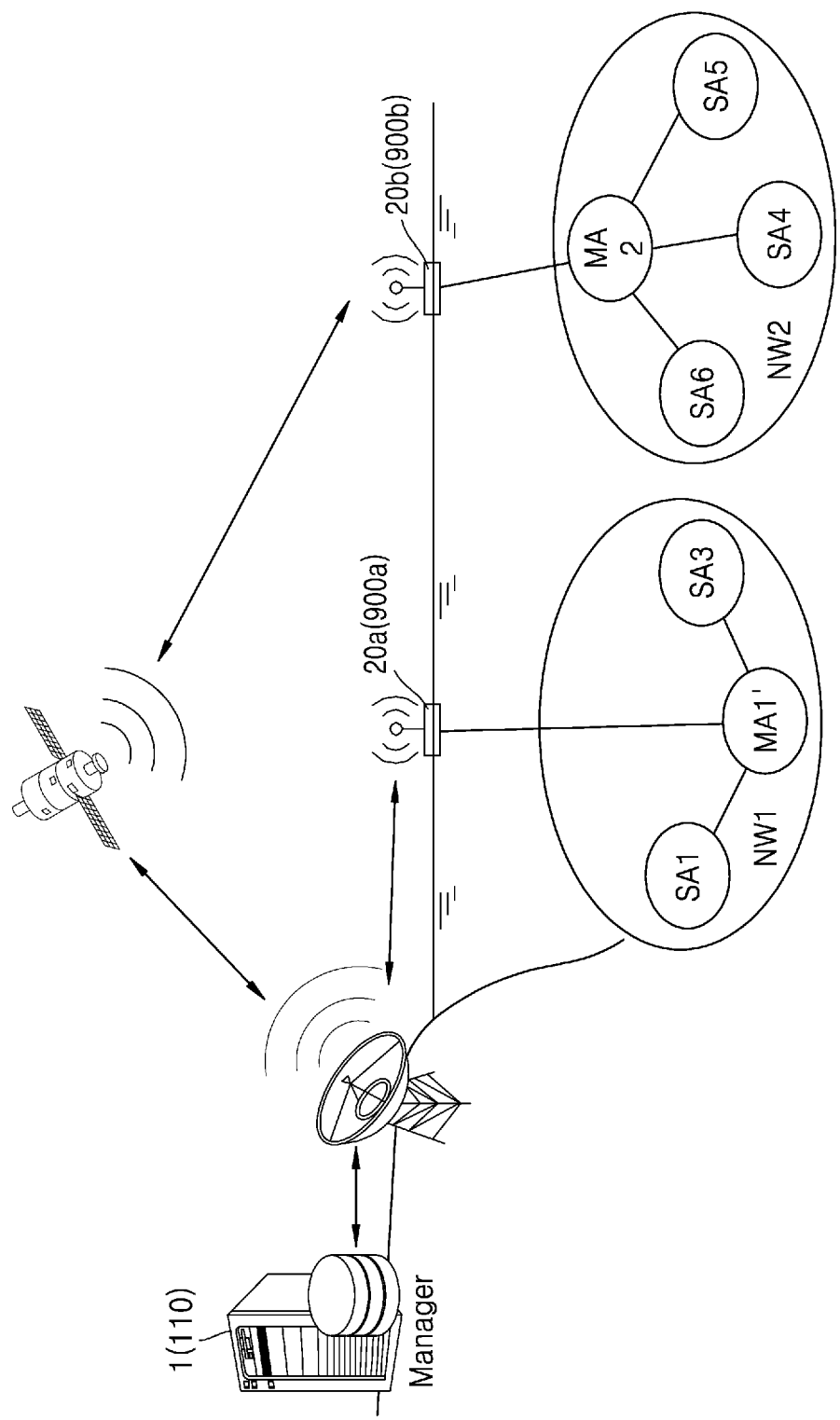
Figure 17:
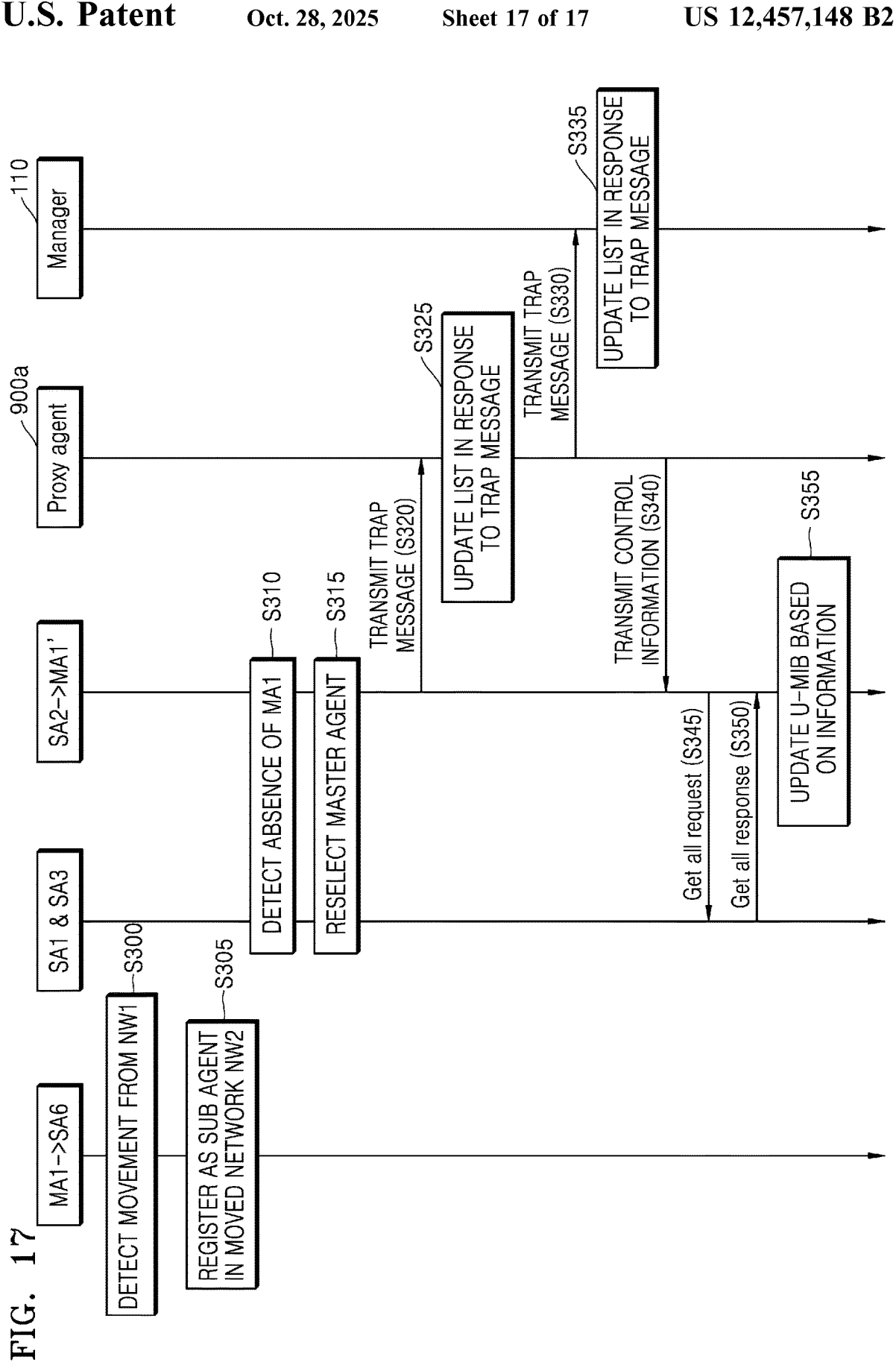

FIGS. 15 to 17 are views for explaining an underwater network management operation as an underwater device corresponding to a master agent moves from a space corresponding to a first underwater network to a space corresponding to a second underwater network.

Referring to FIGS. 15 and 16, the configuration of the underwater network management system 100 may be similar to that of FIG. 13. The first underwater network NW1 may include the first master agent MA1 and the sub agents SA1, SA2, and SA3 connected to the first master agent MA1. The second underwater network NW2 may include the second master agent MA2 and the sub agents SA4 and SA5 connected to the second master agent MA2.

An underwater device corresponding to a master agent may remain fixed at a certain location or may be freely movable depending on the type or characteristics of the device. An underwater management information base of a master agent that maintains fixed status may include the managed objects of Table 8, and an underwater management information base of a movable master agent may include the managed objects of Table 9.

For example, the first master agent MA1 is a movable master agent and may correspond to the UUV, AUV, ROV, and the like described above. During operation, the first master agent MA1 may move from a space corresponding to the first underwater network NW1 to a space corresponding to the second underwater network NW2. In this case, normal communication between the sub agents SA1, SA2, and SA3 existing in the first underwater network NW1 and the first master agent MA1 may not be performed, or communication performance and power efficiency may deteriorate.

According to an embodiment of the present disclosure, the underwater network management system 100 may prevent the problems described above by actively reconfiguring an underwater network when the movement of a master agent is detected.

For example, as shown in FIG. 16, the first master agent MA1 moved to the second underwater network NW2 may be connected to the second master agent MA2 by being registered in the second underwater network NW2 as a sub agent SA6. The underwater network management system 100 may reconfigure the first underwater network NW1 by reselecting a master agent of the first underwater network NW1 (e.g., by selecting the sub agent SA2 as a master agent MA1').

In this regard, FIG. 17 shows a specific embodiment of an underwater network management operation upon detecting the movement of a master agent. Referring to FIG. 17, in operation S300, a master agent (e.g., the first master agent MA1) may detect movement from a location in a space corresponding to the first underwater network NW1 to another location.

An underwater device corresponding to the first master agent MA1 may move according to driving of a driving unit. Based on the driving of the driving unit, the first master agent MA1 may detect movement to another location, and may update the managed objects related to mobility described above in FIG. 12 from among managed objects of an underwater management information base based on movement status, movement distance, and the like.

The first master agent MA1 may detect departure from the space corresponding to the first underwater network NW1 based on a detected movement distance, a detected location, or whether communication with the previously connected sub agents SA1, SA2, and SA3 is possible.

For example, in operation S305, when the first master agent MA1 moves to the second underwater network NW2, the first master agent MA1 may be registered as the sub agent SA6 in the moved second underwater network NW2, and thus, the second underwater network NW2 may be reconfigured. The operation of being registered in the second underwater network NW2 as the sub agent SA6 is the same as or similar to operations S220 to S270 of FIG. 14, and thus, a description thereof will not be given herein.

Although not shown, the first master agent MA1 may include a list of sub agents included in the first underwater network NW1, but may delete the list after the first master agent MA1 is registered as the sub agent SA6 in the second underwater network NW2.

In operation S310, the sub agents SA1, SA2, and SA3 existing in the first underwater network NW1 may detect that the moved first master agent MA1 does not exist in the space corresponding to the first underwater network NW1.

For example, the sub agents SA1, SA2, and SA3 may detect movement of the first master agent MA1 through a communication device or the like. Alternatively, when connection between the first master agent MA1 and the sub agents SA1, SA2, and SA3 is disconnected because the first master agent MA1 is registered in the second underwater network NW2, the sub agents SA1, SA2, and SA3 may detect that the first master agent MA1 does not exist in a space corresponding to the first underwater network NW1.

In operation S315, the underwater network management system 100 may reselect one of the sub agents SA1, SA2, and SA3 existing in the first underwater network NW1 as a master agent.

The reselection operation may be performed according to various previously known protocols or algorithms. For example, the master agent may be randomly selected based on a low-energy adaptive clustering hierarchy (LEACH) protocol. Alternatively, a sub agent having the highest power level from among the sub agents SA1, SA2, and SA3 may be selected as the master agent. According to an embodiment, the master agent may be selected based on protocols such as LEACH-C and power-efficient gathering in sensor information system (PEGASIS).

According to an example shown in FIG. 16, the second sub agent SA2 may be selected as the master agent MA1', and accordingly, the first underwater network NW1 may be reconfigured. According to an embodiment, the reselected master agent MA1' may create a list having information about the sub agents SA1 and SA3 included in the first underwater network NW1.

In operation S320, the reselected master agent MA1' may transmit a trap message including information related to the reconfiguration of the first underwater network NW1 to the proxy agent 900a, and in operation S325, the proxy agent 900a may update the list in response to the received trap message.

The reselected master agent MA1' may transmit a trap message including information related to the reconfigured first underwater network NW1 to the proxy agent 900a. For example, the trap message may include information about a master agent and sub agents of the reconfigured first underwater network NW1.

The proxy agent 900a may recognize that the first underwater network NW1 is reconfigured based on the received trap message and update the list according to the recognition result. For example, the proxy agent 900a may delete the master agent MA1 previously registered in the list and change the second sub agent SA2 to the master agent MA1'.

Although not shown, the proxy agent 900a may update an underwater management information base of the existing master agent MA1 based on the reconfigured first underwater network NW1 by copying and customizing the underwater management information base using information about the reselected master agent MA1'.

Similar to operations S260 to S270 of FIG. 14, in operation S330, the proxy agent 900a may transmit a trap message for informing the manager 110 of information related to the reconfiguration of the first underwater network NW1, and in operation S340, the manager 110 may update the list corresponding to the manager 110 in response to the received trap message.

The master agent of the first underwater network NW1 may be registered as the existing master agent MA1 in the list of the manager 110, and the reselected master agent MA1' may be registered as the sub agent SA2 of the first underwater network NW1. The manager 110 may change the reselected master agent MA1' as the master agent of the first underwater network NW1 by updating the list in response to the received trap message, and may change the existing master agent MA1 as the sub agent SA6 of the second underwater network NW2.

In operation S340, the proxy agent 900a may transmit control information possessed by the existing master agent MA1 to the reselected master agent MA1'. The control information may correspond to information for controlling sub agents included in the first underwater network NW1. The reselected master agent MA1' may control the sub agents SA1 and SA3 based on the received control information.

In operation S345, the reselected master agent MA1' may request all information of the connected sub agents SA1 and SA3 in order to update the underwater management information base (u-MIB). For example, the master agent MA1' may request information transmission by transmitting a "Get all request" message to the sub agents SA1 and SA3.

In operation S350, in response to the request, each of the sub agents SA1 and SA3 may transmit managed objects (MOs) included in the underwater management information base to the master agent MA1'. For example, each of the sub agents SA1 and SA3 may transmit a "Get all response" message including the managed objects to the master agent MA1'.

In operation S355, the master agent MA1' may update the underwater management information base of the master agent MA1' based on the received managed objects. Thereafter, upon receiving a request message (Get/Set request, etc.) from the proxy agent 900a, the agent MA1' may transmit a response message (Get/Set response, etc.) including a managed object of the updated underwater management information base to the proxy agent 900a.

According to the embodiments of FIGS. 12 to 17, the underwater network management system 100 may actively reconfigure an underwater network when the underwater device (or node) 10 corresponding to a master agent or a sub agent moves. Accordingly, smooth underwater communication of underwater devices 10 may be effectively maintained, and problems such as reduced communication efficiency or increased power consumption of underwater devices may be minimized according to the reconfiguration of the underwater network.

While the disclosure has been particularly shown and described with reference to embodiments thereof, it will be understood that various changes in form and details may be made therein without departing from the spirit and scope of the following claims.

The present invention described above may be implemented as computer-readable code in a recording medium in which a program is recorded. A computer-readable recording medium includes all types of recording devices in which data that can be read by a computer system is stored. Examples of computer-readable media include Hard Disk Drive (HDD), Solid State Disk (SSD), Silicon Disk Drive (SDD), ROM, RAM, CD-ROM, magnetic tape, floppy disk, optical data storage device, etc. Accordingly, the above detailed description should not be construed as limiting in all respects and should be considered illustrative. In addition, it will be apparent to one of ordinary skill in the art that various changes and modifications are possible within a range that does not deviate from the basic principles of the present disclosure.

The invention claimed is:

1. An underwater network management system comprising:
   a manager corresponding to a management station; and
   a plurality of agents connected to the manager and corresponding to a gateway and a plurality of underwater devices,
   wherein each of the manager and the plurality of agents comprises an underwater management information base (u-MIB) including a plurality of managed objects for managing an underwater network and the plurality of underwater devices, and
   the manager controls operations for status monitoring and management of the underwater network and the plurality of underwater devices based on information included in managed objects provided from the plurality of agents
   wherein the plurality of agents comprise:
   a proxy agent corresponding to the gateway;
   a master agent corresponding to an underwater device connected to the proxy agent from among the plurality of underwater devices; and
   a sub agent corresponding to an underwater device connected to the master agent,
   wherein the proxy agent transmits a request message received from the manager to the master agent,
   the master agent transmits the request message to the sub agent, receives a first response message including at least one first managed object related to the request message from the sub agent, and transmits a second response message including the at least one first managed object included in the received first response message and at least one second managed object related to the request message from among managed objects of the master agent to the proxy agent, and
   the proxy agent transmits a third response message including the at least one first managed object and the at least one second managed object included in the second response message received from the master agent to the manager.

2. The underwater network management system of claim 1, wherein each of the plurality of agents transmits a response message including at least one of the plurality of managed objects included in the underwater management information base to the manager in response to the request message transmitted from the manager, or, in response to an event occurring in a corresponding gateway or underwater device, transmits a trap message including at least one managed object related to the event to the manager.

3. The underwater network management system of claim 2, wherein the sub agent comprises:

a plurality of sub agents corresponding to the plurality of underwater devices, wherein the proxy agent comprises a plurality of temporary management information bases corresponding to the plurality of sub agents, and updates a first temporary management information base corresponding to the first sub agent based on at least one managed object included in a message received from a first sub agent from among the plurality of sub agents.

4. The underwater network management system of claim 3, wherein the proxy agent further comprises a log recorder configured to record a point in time at which a message is received or a point in time at which a temporary management information base is updated for each of the plurality of sub agents.

5. The underwater network management system of claim 3, wherein the proxy agent receives the request message from the manager, obtains at least one management object related to the request message from the first sub agent or the first temporary management information base based on whether communication with the first sub agent from among the plurality of sub agents is possible, and transmits a response message including the obtained at least one managed object to the manager.

6. The underwater network management system of claim 5, wherein the proxy agent obtains at least one managed object related to the request message from the first sub agent when communication with the first sub agent is possible, and obtains at least one managed object related to the request message from the first temporary management information base when communication with the first sub agent is impossible.

7. The underwater network management system of claim 6, wherein the proxy agent stores the request message when communication with the first sub agent is impossible, transmits the request message to the first sub agent when a preset time elapses or when communication with the first sub agent is detected, receives at least one managed object related to the request message from the first sub agent, and transmits a response message including the received at least one managed object to the manager.

8. The underwater network management system of claim 7, wherein the proxy agent updates the first temporary management information base based on the at least one managed object received from the first sub agent.

9. An operation method of an underwater network management system, the operation method comprising:

receiving, by a gateway included in the underwater network management system, a request message from a management station;

receiving a response message including information related to the request message from at least one of a plurality of underwater devices connected to the gateway; and transmitting a response message including information included in at least one received response message to the management station, wherein information related to the request message corresponds to at least one managed object related to the request message from among a plurality of managed objects included in an underwater management information base of each of the plurality of underwater devices wherein the plurality of underwater devices comprise:

a master agent corresponding to an underwater device connected to the gateway from among the plurality of underwater devices; and a sub agent corresponding to an underwater device connected to the master agent, wherein the gateway transmits the request message received from the management station to the master agent, wherein the master agent transmits the request message to the sub agent, receives a first response message including at least one first managed object related to the request message from the sub agent, and transmits a second response message including the at least one first managed object included in the received first response message and at least one second managed object related to the request message from among managed objects of the master agent to the gateway, and wherein the gateway transmits a third response message including the at least one first managed object and the at least one second managed object included in the second response message received from the master agent to management station.

10. The operation method of claim 9, wherein the gateway comprises a plurality of temporary management information bases corresponding to the plurality of underwater devices, and the operation method further comprising:

updating a first temporary management information base corresponding to the first underwater device based on at least one managed object included in a message received from a first underwater device from among the plurality of underwater devices.

11. The operation method of claim 10, wherein the receiving of a response message including information related to the request message from at least one of the plurality of underwater devices comprises:

based on whether communication with a second underwater device from among the at least one underwater device is possible, obtaining information related to the request message from the second underwater device or a second temporary management information base corresponding to the second underwater device.

12. The operation method of claim 11, comprising:

obtaining information related to the request message from the second underwater device when communication with the second underwater device is possible; and obtaining information related to the request message from the second temporary information base when communication with the second underwater device is impossible.

13. The operation method of claim 12, further comprising:

storing the request message when communication with the second underwater device is impossible;

transmitting the stored request message to the second underwater device when a preset time elapses or when it is detected that communication with the second underwater device is possible;

receiving information related to the request message from the second underwater device; and transmitting a response message including the received information to the management station.

14. The operation method of claim 13, further comprising:

updating the second temporary management information base based on information received from the second underwater device.

* * * * *